(12) United States Patent
Hamada

(10) Patent No.: US 7,693,381 B2
(45) Date of Patent: Apr. 6, 2010

(54) OPTICAL DEVICE, AND PRODUCTION METHOD FOR PHOTONIC CRYSTAL SLAB

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 874 days.

(21) Appl. No.: 10/586,830

(22) PCT Filed: Dec. 10, 2004

(86) PCT No.: PCT/JP2004/018509

§ 371 (c)(1),
(2), (4) Date: Jul. 20, 2006

(87) PCT Pub. No.: WO2005/071451

PCT Pub. Date: Aug. 4, 2005

(65) Prior Publication Data

US 2009/0022464 A1    Jan. 22, 2009

(30) Foreign Application Priority Data

Jan. 22, 2004 (JP) ............................ 2004-014746

(51) Int. Cl.
*G02B 6/10* (2006.01)
(52) U.S. Cl. .................................. 385/129; 385/131
(58) Field of Classification Search ................. 385/14, 385/129–132
See application file for complete search history.

(56) References Cited

U.S. PATENT DOCUMENTS 6,560,006 B2 * 5/2003 Sigalas et al. ............... 359/321
7,027,701 B2 * 4/2006 Parker et al. ............... 385/129

(Continued)

FOREIGN PATENT DOCUMENTS

CN    1445580 A    10/2003

(Continued)

OTHER PUBLICATIONS

M.D.B. Charlton et al., "Guided Mode Analysis, and Fabrication of a 2-Dimensional Visible Photonic Band Structure Confined Within a Planar Semiconductor Waveguide," Materials Science & Engineering B49, 1997, pp. 155-165, vol. 49, No. 2, Elsevier Science S.A., USA.

(Continued)

*Primary Examiner*—Daniel Petkovsek
(74) *Attorney, Agent, or Firm*—RatnerPrestia

(57) ABSTRACT

An optical device which includes a GI-type photonic crystal slab which includes: a first member which has a distribution of refractive indexes reduced in both directions from an optical axis of incident light as to a first direction vertical to the optical axis; and a second member periodically placed in substance among the first members as to a second direction different from the first direction, wherein the distribution of refractive indexes of the first member which relates to the first direction, a thickness which relates to the first direction of the GI-type photonic crystal slab, a wavelength of the incident light and an incident end beam spot radius $\omega_1$ which relates to the first direction inside an incident end of the GI-type photonic crystal slab entered by the light of the incident light are determined to have the incident light substantially confined inside the GI-type photonic crystal slab as to the first direction.

22 Claims, 19 Drawing Sheets

U.S. PATENT DOCUMENTS

| | | | |
|---|---|---|---|
| 7,184,639 B2* | 2/2007 | Hamada | 385/129 |
| 2003/0174961 A1 | 9/2003 | Hamada | |
| 2004/0067035 A1* | 4/2004 | Parker et al. | 385/129 |
| 2004/0086244 A1* | 5/2004 | Zoorob et al. | 385/123 |
| 2005/0152659 A1* | 7/2005 | Baba et al. | 385/129 |

FOREIGN PATENT DOCUMENTS

| | | |
|---|---|---|
| EP | 1 394 579 A2 | 3/2004 |
| JP | 6-222234 | 8/1994 |
| JP | 9-5549 | 1/1997 |
| JP | 2001-091701 | 4/2001 |
| JP | 2001-272566 | 10/2001 |
| JP | 2001-337236 | 12/2001 |
| JP | 2002-365599 | 12/2002 |
| JP | 2003-240989 | 8/2003 |
| JP | 2004-086070 | 3/2004 |

OTHER PUBLICATIONS

Steven G. Johnson et al., "Guided Modes in Photonic Crystal Slabs," Physical Review B, 1999, pp. 5751-5758, vol. 60, No. 8, The American Physical Society, USA.

Claude Weisbush et al., "3D Control of Light in Waveguide-Based Two-Dimensional Photonic Crystals," IEICE Trans. on Electronics, 2001, pp. 660-668, vol E84-C, No. 5.

International Search Report for corresponding International PCT Application No. PCT/JP2004/018509 dated Mar. 29, 2005.

Thomas F. Krauss et al., "Photonic crystals in the optical regime—past, present and future", Progress in Quantum Electronics 23, vol. 23, pp. 51-96, published in 1999, Scotland, UK.

* cited by examiner

Fig.7(a)
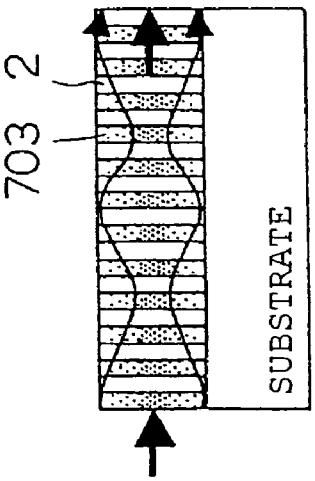
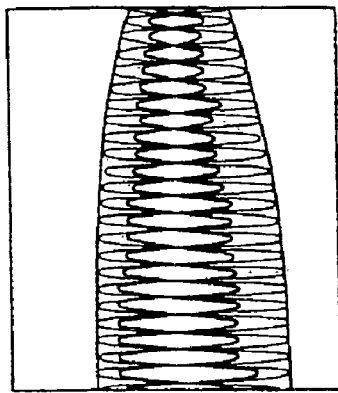
Fig.7(b)
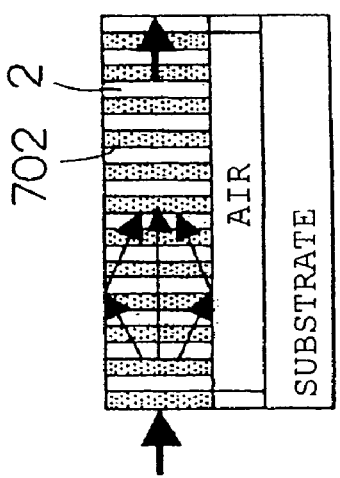
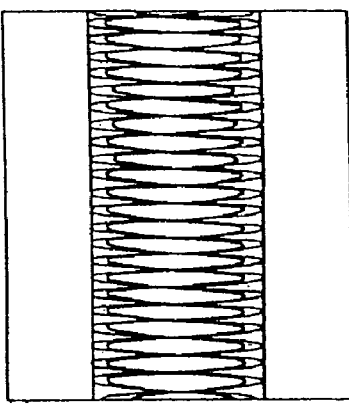
Fig.7(c)
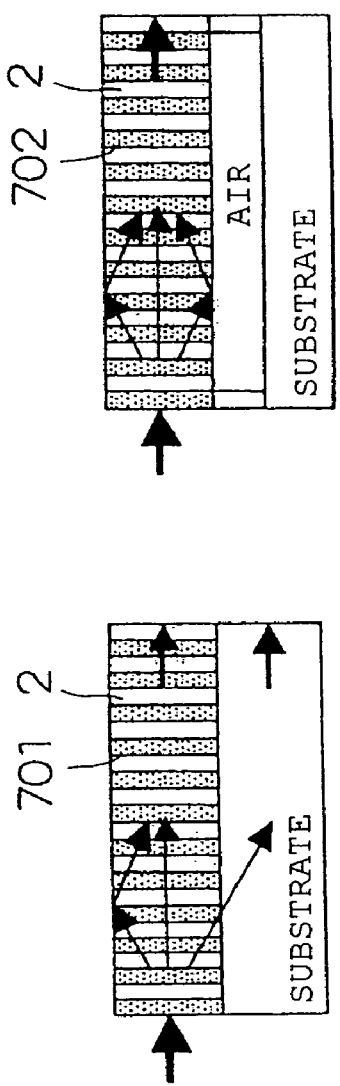
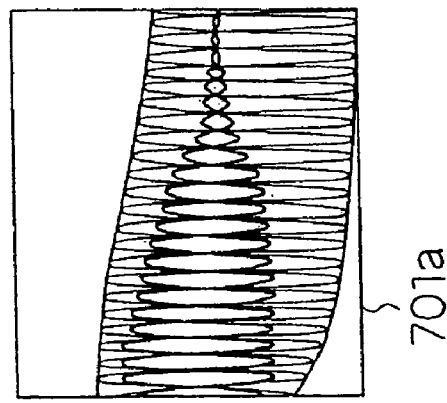

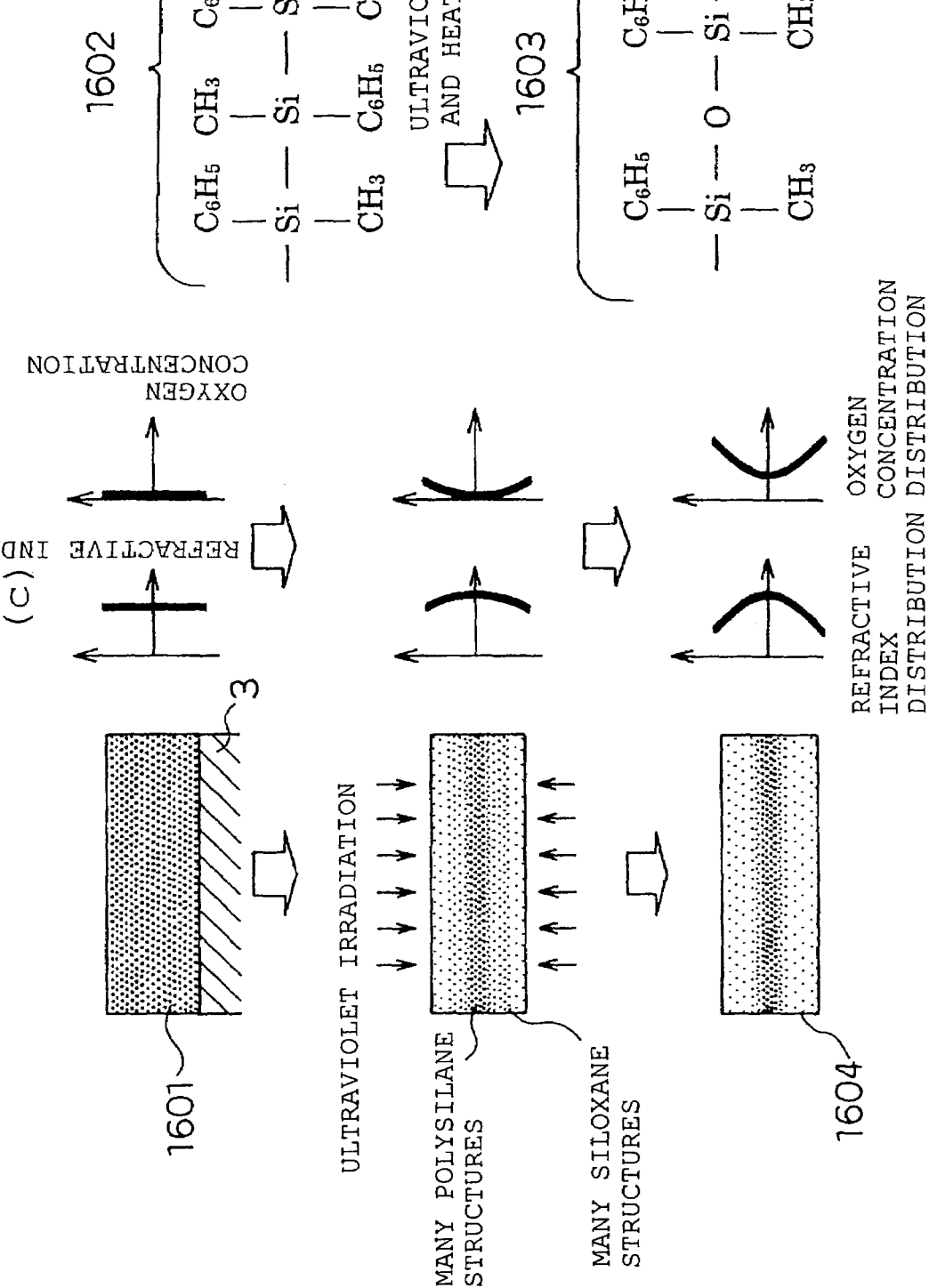

ID, AND PRODUCTION
OPTICAL DEVICE, AND PRODUCTION METHOD FOR PHOTONIC CRYSTAL SLAB

This application is a U.S. National Phase Application of PCT International Application PCT/JP2004/018509, filed Dec. 10, 2004.

TECHNICAL FIELD

The present invention relates to an optical device which uses a photonic crystal slab used for a filter, a prism, a waveguide, an optical plane circuit and the like and a manufacturing method of the photonic crystal slab.

BACKGROUND ART

A conventional photonic crystal slab is configured by a two-dimensional photonic crystal which has multiple columnar portions (refractive index=$v_1$) arranged in a two-dimensional cycle in a slab of a fixed refractive index (refractive index=$v_2$), a lower cladding and an upper cladding (refractive index=$v_3$) of a lower refractive index than $v_1$, $v_2$, which sandwich the two-dimensional photonic crystal in a film thickness direction and a substrate.

(1) Light propagating in the photonic crystal slab is confined in a vertical direction by total reflection at a boundary with the upper and lower claddings of the refractive index lower than any part of the two-dimensional photonic crystal (refer to Japanese Patent Laid-Open No. 2001-337236 (FIG. 1 for instance) for instance).

(2) There are also the cases where the two-dimensional and three-dimensional photonic crystals change cycle length and a direction of periodicity gradually or stepwise as to a position in the crystal (refer to Japanese Patent Laid-Open No. 2001-91701 (FIG. 9 for instance) for instance). FIG. 9 shows a configuration in which a high refractive index material 10 ($SiO_2$) and a low refractive index material 11 ($SiO_2$) are arranged to overlap alternately in a Z direction. FIG. 10 shows a principle of waveguide action in the configuration of FIG. 9.

All the disclosures of the documents of Japanese Patent Laid-Open No. 2001-337236 and Japanese Patent Laid-Open No. 2001-91701 are cited in its entirety and thereby become an integral part hereof.

(1) In the former case, however, it is necessary to select a material which satisfies a relation of $v_1 \neq v_2$, $v_1 > v_3$, $v_2 > v_3$ among the columnar portions (refractive index=$v_1$) arranged in the two-dimensional cycle, other portions than columnar portions (refractive index=$v_2$) and cladding portions (refractive index=$v_3$). To reduce leakage of the light in the film thickness direction, a refractive index difference between $v_1$ and $v_3$ and the refractive index difference between $v_2$ and $v_3$ should preferably be large. To configure the photonic crystals, the refractive index difference between $v_1$ and $v_2$ should also be as large as possible.

For this reason, combinations of materials are limited.

For instance, in the case where the air of which refractive index is lowest (refractive index=1) is selected as the cladding, the photonic crystal portion has the high refractive index material (a semi-conducting material of refractive index=3 or more for instance) and the low refractive index material (resin, glass or air for instance) combined therein. Thus, it is possible to secure a minimum refractive index difference as the photonic crystal (a photonic bandgap can be obtained by using the air as the low refractive index material, in which case $v_1 > v_3$ is not exactly satisfied).

However, an air bridge structure which uses the air as the cladding requires the photonic crystal to float in the air, and so its handling can be difficult.

In the case of using a fluorine compound (refractive index=approximately 1.3) which is the lowest solid refractive index material as the cladding, functions as the photonic crystal are limited when a semi-conducting material of a refractive index close to the high refractive index material is used as the low refractive index material of the photonic crystal portion. When a material of a refractive index of 2 or less such as resin or glass is used as the low refractive index material of the photonic crystal portion, the refractive index difference from the cladding becomes smaller and confinement of the light in the film thickness direction becomes weaker (in the case of the two-dimensional photonic crystal of which film thickness is 5 μm or less in particular, diffraction is so large that the light mostly leaks).

(2) In the latter case, a core of a long-period photonic crystal portion and the cladding of a short-period photonic crystal which surrounds the core are used to increase phase velocity in surrounding directions by periodic control so as to confine the light to the core of relatively low phase velocity.

This method can control the state of a propagation mode field of the light in a y direction freely by controlling the period, which is very advantageous in terms of device design. As the core and cladding are configured by solids, they are easy to handle and practical.

However, this method which changes the period requires sophisticated control in a manufacturing process, and also renders a manufacturing apparatus particular.

In consideration of the conventional problems, an object of the present invention is to provide an optical device capable of confining the light in a direction which has no period of the photonic crystal with a simpler optical system and a manufacturing method of the optical device for instance.

DISCLOSURE OF THE INVENTION

The 1st aspect of the present invention is an optical device which includes a photonic crystal comprising:

a first member which has a distribution of refractive index decreasing with distance from an optical axis along a first direction perpendicular to the optical axis; and a second member which is substantially periodically placed within the first member along a second direction different from the first direction.

The 2nd aspect of the present invention is the optical device according to the 1st aspect of the present invention, wherein the distribution of the refractive index decreasing with distance from the optical axis is the distribution of the refractive index decreasing in a direction other than the direction of periodic placement of the second member.

The 3rd aspect of the present invention is the optical device according to the 2nd aspect of the present invention, wherein the incident light is to be substantially confined inside the photonic crystal along the first direction by so determining:

(a) the distribution of the refractive indexes of the first member along the first direction;

(b) a thickness of the photonic crystal along the first direction;

(c) a wavelength of incident light; and (d) a beam spot radius which relates to the first direction inside a light incident end of the photonic crystal entered by the light of the incident light.

The 4th aspect of the present invention is the optical device according to the 3rd aspect of the present invention, wherein:

the photonic crystal is in a film form;

the first direction is a direction of a film thickness of the film form; and the second direction is a direction parallel to a film surface of the film form.

The 5th aspect of the present invention is the optical device according to the 4th aspect of the present invention, wherein the distribution of the refractive indexes of the first member which relates to the direction of the film thickness is more precipitous than a predetermined distribution function determined based on a thickness W which relates to the direction of the film thickness of the photonic crystal, a wavelength λ of the incident light and a beam spot radius $\omega_1$ which relates to the direction of the film thickness inside the light incident end of the incident light.

The 6th aspect of the present invention is the optical device according to the 5th aspect of the present invention, wherein the predetermined distribution function is substantially given by the following quadric which includes a refractive index distribution constant g and a maximum value $n_1$ of the refractive index which relates to a y-coordinate about the direction of the film thickness in reference to the optical axis.

$$n(y) = n_1\left(1 - \frac{g^2 y^2}{2}\right) \quad \text{[Formula 1]}$$

The 7th aspect of the present invention is the optical device according to the 5th aspect of the present invention, wherein the predetermined distribution function is substantially given by the following function which includes a refractive index distribution constant g, a flat portion constant a and a maximum value $n_1$ of the refractive index which relates to a y-coordinate about the direction of the film thickness in reference to the optical axis.

$$n'(y) = \begin{cases} n_1\left\{1 - \frac{g^2(y+a)^2}{2}\right\} & (y \leq -a) \\ n_1 & (-a \leq y \leq a) \\ n_1\left\{1 - \frac{g^2(y-a)^2}{2}\right\} & (a \leq y) \end{cases} \quad \text{[Formula 2]}$$

The 8th aspect of the present invention is the optical device according to the 6th aspect of the present invention, wherein the refractive index distribution constant g substantially satisfies the following formula.

$$g \geq \frac{2\lambda}{\pi \omega_1 W} \quad \text{[Formula 3]}$$

The 9th aspect of the present invention is the optical device according to the 5th aspect of the present invention, wherein a curvature radius of a wave front of the incident light at the light incident end is substantially infinite.

The 10th aspect of the present invention is the optical device according to the 9th aspect of the present invention, wherein the beam spot radius $\omega_1$ is substantially a half of the thickness W.

The 11th aspect of the present invention is the optical device according to the 9th aspect of the present invention, wherein the film thickness varies at a predetermined location.

The 12th aspect of the present invention is the optical device according to the 11th aspect of the present invention, wherein the incident light is to be leaked outside the photonic crystal at the predetermined location along the film thickness direction by so determining:

the distribution of the refractive indexes of the first member as to the film thickness direction;

the thickness W of the photonic crystal as to the film thickness direction;

a wavelength λ of the incident light; and a beam spot radius $\omega_1$ inside the light incident end of the incident light as to the film thickness direction.

The 13th aspect of the present invention is the optical device according to the 9th aspect of the present invention, wherein a substantially periodical placement of the second member varies at a predetermined location.

The 14th aspect of the present invention is the optical device according to the 13th aspect of the present invention, wherein the predetermined location is the location where the beam spot radius of the incident light inside the photonic crystal which relates to the film thickness direction takes a maximum value or a minimum value.

The 15th aspect of the present invention is the optical device according to the 13th aspect of the present invention, wherein the predetermined location is the location continued from the light incident end to a light outgoing end of the photonic crystal which emits the light and has no second member substantially placed therein.

The 16th aspect of the present invention is the optical device according to the 9th aspect of the present invention, wherein the second member is air placed by using holes which extend in the film thickness direction.

The 17th aspect of the present invention is the optical device according to the 16th aspect of the present invention, further comprising a substrate which holds the photonic crystal, wherein the holes are extending to the substrate side.

The 18th aspect of the present invention is the optical device according to the 3rd aspect of the present invention, further comprising an inducing portion which induces the incident light to the light incident end.

The 19th aspect of the present invention is the optical device according to the 18th aspect of the present invention, wherein the inducing portion converts the incident light to render the curvature radius of the wave front at the light incident end substantially infinite.

The 20th aspect of the present invention is the optical device according to the 18th aspect of the present invention, wherein the inducing portion converts the incident light to have a beam waist formed at the light incident end.

The 21st aspect of the present invention is the optical device according to the 18th aspect of the present invention, wherein the inducing portion converts the incident light to render the beam spot radius which relates to the first direction inside the light incident end substantially a half of the thickness of the photonic crystal which relates to the first direction.

The 22nd aspect of the present invention is the optical device according to the 3rd aspect of the present invention, wherein the first member is a member which has a siloxane structure distributed correspondingly to the refractive index distribution in a base material of which main component is polysilane.

The 23rd aspect of the present invention is a manufacturing method of a photonic crystal slab which includes a first member which has a distribution of refractive index along a first direction perpendicular to an optical axis and a second member substantially periodically placed within the first member along a second direction different from the first direction, the method comprising:

a first step of supplying a base material of a predetermined thickness of which main component is polysilane;

a second step of causing an oxidation reaction of the polysilane in the supplied base material and controlling a degree of progress of the oxidation reaction along a thickness direction so as to form the distribution of the refractive index decreasing with distance from the optical axis; and a third step of forming the second member in a step before or after the second step.

The 24th aspect of the present invention is the manufacturing method of a photonic crystal slab according to the 23rd aspect of the present invention, wherein the distribution of the refractive index decreasing with distance from the optical axis is the distribution of the refractive indexes reduced in a direction other than the direction of the periodical placement of the second member.

The 25th aspect of the present invention is the manufacturing method of a photonic crystal slab according to the 24th aspect of the present invention, wherein:

the first direction is a direction of thickness of the base material; and the second direction is a direction parallel to a surface of the base material.

The 26th aspect of the present invention is the manufacturing method of a photonic crystal slab according to the 25th aspect of the present invention, wherein:

according to the second step, the distribution of the refractive indexes is generated by irradiating the base material with ultraviolet light from both sides thereof; and an amount of the ultraviolet light irradiation is controlled to have a predetermined standard satisfied by a state of the distribution of the refractive indexes.

The 27th aspect of the present invention is the manufacturing method of a photonic crystal slab according to the 26th aspect of the present invention, wherein:

according to the first step, the base material is applied on a predetermined substrate;

according to the second step, the ultraviolet irradiation and heat treatment are performed to the applied base material to harden the base material; and according to the third step, cylindrical holes as the second members are periodically placed on the hardened base material by using a mold or performing etching.

The 28th aspect of the present invention is the manufacturing method of a photonic crystal slab according to the 27th aspect of the present invention, wherein the predetermined standard is that the distribution of the refractive index is more precipitous than a predetermined distribution function determined based on a thickness W which relates to the direction of the film thickness of the photonic crystal slab, a wavelength $\lambda$ of the incident light and a beam spot radius $\omega_1$ which relates to the direction of the film thickness inside a light incident end of the incident light.

The 29th aspect of the present invention is the optical device according to the 7th aspect of the present invention, wherein the refractive index distribution constant g substantially satisfies the following formula.

$$g \geq \frac{2\lambda}{\pi \omega_1 W} \qquad \text{[Formula 3]}$$

As is apparent from the description, the present invention has the effect of confining the light in a direction which has no period of the photonic crystal with a simpler optical system.

BRIEF DESCRIPTION OF THE DRAWINGS

FIGS. 7 (a) to 7 (c) are explanatory diagrams of a result of a three-dimensional FDTD simulation of the GI-type photonic crystal slab according to the first embodiment of the present invention;

FIGS. 16 (a) to 16 (d) are explanatory diagrams of characterizing portions of a manufacturing method of a GI-type photonic crystal according to a second embodiment of the present invention;

DESCRIPTION OF SYMBOLS

Figure 1:
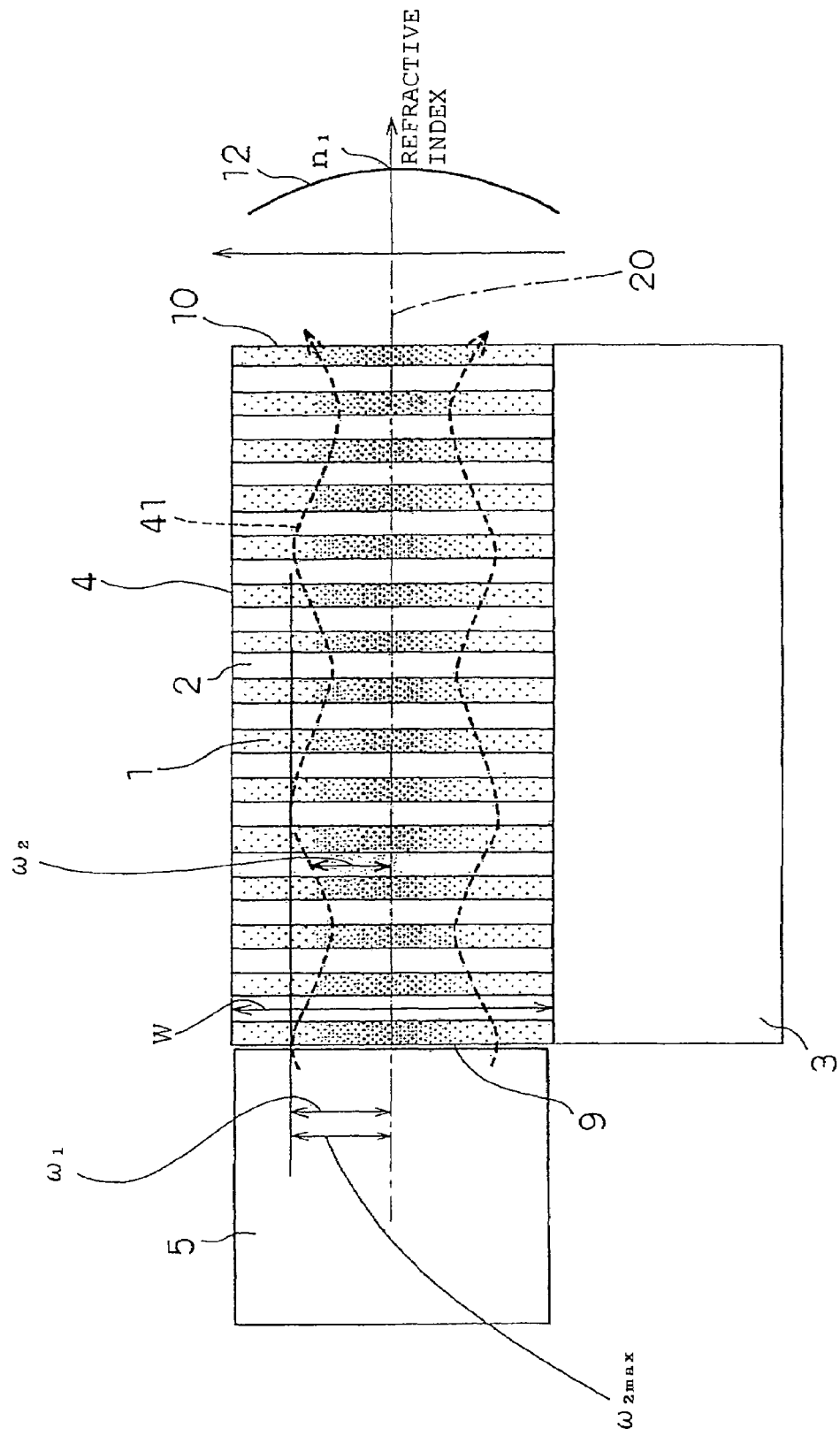
FIG. 1 is a schematic sectional view of a GI-type photonic crystal slab according to a first embodiment of the present invention.

1 GI-type slab
2 Hole
3, 3' Substrates
4 GI-type photonic crystal slab
5 Incident side waveguide
9 Incident end
10 Outgoing end
12 Refractive index distribution
13 Cross-section
17 Basic lattice vector of a triangular lattice
18 Fixed portion
19 Refractive index distribution portion
20 Optical axis (maximum refractive index position)
30 GRIN lens
31 Layer of air
90 Reduced film thickness portion
91 Minimum refractive index distribution constant increased portion
92 Reduced film thickness portion maximum refractive index position
100 Light confining portion
101 Light leakage portion
102 Leaking light
103 (Leakage portion) refractive index distribution
110 Beam waist
111 Functional portion
120 Substrate interior hole
130 Periodic defect portion
140 Light source beam
141 Lens
142 Wave front
150 Optical fiber
151 Core
152 Cladding
153 Optical axis of an optical fiber
154 Inducing portion
155 Beam spot trajectory
156 Taper
1601 Sheet-like polysilane
1602 Polysilane structure (high refractive index)
1603 Siloxane structure (low refractive index)
1604 Refractive index distribution formed slab

BEST MODE FOR CARRYING OUT THE INVENTION

Embodiments of the present invention will be described below by referring to the drawings.

First Embodiment

First, a principle of an optical device of the present invention will be described by mainly referring to FIGS. 1 and 2.

Figure 2:
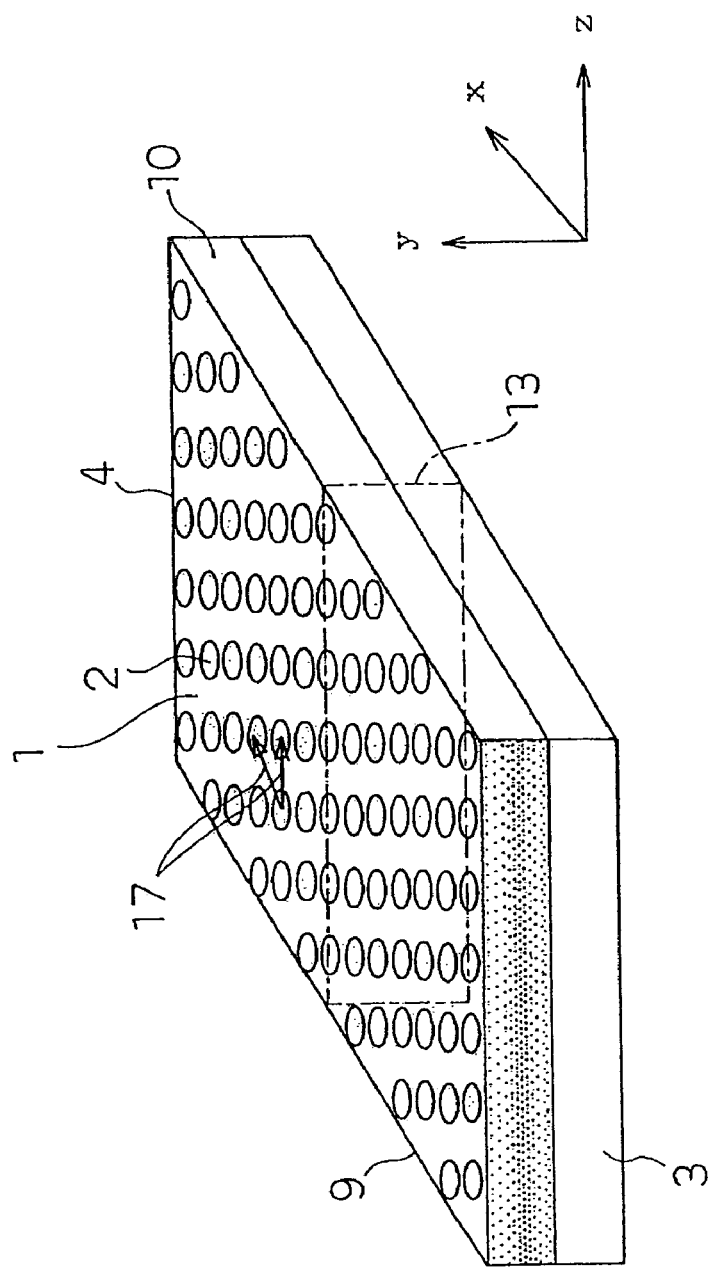
FIG. 2 is a schematic view of the GI-type photonic crystal slab according to the first embodiment of the present invention.

Here, FIG. 1 is a sectional view of a photonic crystal slab which has a refractive index distribution in which a refractive index becomes maximum around a center in a film thickness direction and lowers almost like a parabola as it becomes distant from the center (it is named a Graded-Index-type photonic crystal slab herein, and merely referred to as a GI-type photonic crystal slab hereafter). FIG. 1 is also a schematic view of a cross-section 13 (refer to FIG. 2) which includes the film thickness direction and a propagation direction. FIG. 2 is a perspective view of the GI-type photonic crystal slab which shows the position of the cross-section 13.

A beam spot trajectory 41 (refer to FIG. 1 and other drawings) changes discontinuously in a boundary portion between an incident side waveguide 5 (core refractive index: $n_0$) and a GI-type photonic crystal slab 4 or in the boundary portion between the GI-type photonic crystal slab 4 and a hole 2. However, the beam spot trajectory 41 is shown continuously in FIG. 1 and other drawings because the degree of its discontinuity is small (same hereafter).

An incident end spot radius $\omega_1$ inside the GI-type photonic crystal slab of an incident end 9 is equal to or less than a maximum value $\omega_{2max}$ of a beam spot radius $\omega_2$ inside the GI-type photonic crystal slab. However, they match in the case where a curvature radius of a wave front of a beam at the incident end is infinite (the case mainly considered hereafter), which case is shown in the drawings (same hereafter).

With regard to the GI-type photonic crystal slab 4 which forms predetermined columnar portions (columnar members) in a two-dimensional cycle in a slab easily processable by a semiconductor process or a molding process, this embodiment uses a method which controls light by means of a characteristic of a photonic crystal in a vertical direction to film thickness and a method not dependent on the refractive index of a cladding as to confinement of the light in the film thickness direction.

To be more precise, as shown in FIG. 1, an optical device of this embodiment includes the GI-type photonic crystal slab 4 which has a predetermined refractive index periodically placed and an incident side waveguide 5 as an input portion, which renders the light incident on the GI-type photonic crystal slab 4 in a two-dimensional direction vertical to the film thickness direction of a GI-type slab 1 which has a refractive index distribution in which the refractive index does not increase as it becomes distant from the maximum (highest) refractive index portion in the film thickness direction.

The GI-type photonic crystal slab 4 has a film thickness W which is twice or more larger than the beam spot radius $\omega_2$ inside the GI-type photonic crystal slab unambiguously determined by an incident end spot radius $\omega_1$ inside the GI-type photonic crystal slab of the incident end 9, a wavelength λ and a refractive index distribution form in the film thickness direction of the GI-type slab 1.

Thus, it is possible to confine the light in a direction leaking the light due to a diffraction effect by providing the refractive index distribution which satisfies a specific condition of not increasing the refractive index as it becomes distant from the maximum refractive index portion in a direction other than a periodic direction of the photonic crystal.

It is also possible to change a size of the beam spot radius $\omega_2$ arbitrarily in a direction which has no period of the photonic crystal by manipulating the refractive index distribution form.

A manufacturing method of such a photonic crystal which involves manipulation of the refractive index distribution form will be described in a second embodiment.

The GI-type photonic crystal slab 4 corresponds to the photonic crystal of the present invention while the optical device of this embodiment corresponds to the optical device of the present invention.

Next, the configuration and operation of the optical device of this embodiment will be described in further detail.

The optical device of this embodiment includes a substrate 3 and the incident side waveguide 5 of core refractive index $n_0$ connected to the incident end 9 of the GI-type photonic crystal slab 4.

The optical device of this embodiment includes the GI-type photonic crystal slab 4 which forms multiple holes 2 which extends in a y direction and is arranged in a two-dimensional cycle in a z direction which corresponds to a light propagation direction vertical to the y direction of, and an x direction which corresponds to a width direction of the GI-type slab 1 which has the refractive index distribution which lowers along a refractive index distribution 12 which has a maximum value $n_1$ almost at the center in the y direction which corresponds to the film thickness direction and approximately fits the following formula as to a distance y from an optical axis (maximum refractive index position) 20 which corresponds to y=0.

$$n(y) = n_1\left(1 - \frac{g^2 y^2}{2}\right) \quad \text{[Formula 1]}$$

Here, the following formula holds as to a refractive index distribution constant g. In this formula, W denotes the film thickness of the GI-type slab 1, $\omega_1$ denotes the beam spot radius inside the GI-type photonic crystal slab of the incident end 9, and $\lambda$ denotes the wavelength.

$$g \geq \frac{2\lambda}{\pi \omega_1 W} \quad \text{[Formula 3]}$$

The substrate 3 is intended to reinforce strength of the GI-type photonic crystal slab 4. It may be eliminated without a problem because it does not contribute to confinement of the light at all.

Thus, it is possible, by giving variety in addition to a specific change in the refractive index, to increase phase velocity further as it becomes more distant from an optical axis 20 so as to suppress the diffraction which causes light leakage.

A further description will be given later as to why the confinement of the light in the film thickness direction becomes possible if the above-described refractive index distribution in the y direction satisfies the conditions of the formulas 1 and 3. Examples of use of the formulas derived in this embodiment will be described briefly.

To be more specific, the formulas are used in the case of designing and manufacturing the GI-type photonic crystal slab 4 capable of confining the light in the film thickness direction under a situation where, for instance, the wavelength $\lambda$ of the light to be a propagation subject, the beam spot radius $\omega_1$ and the film thickness W of the GI-type slab 1 are predetermined as requirement specifications. To be more precise, the values of the requirement specifications are assigned to the formula 3 to acquire the refractive index distribution constant g so as to determine a distribution function of the formula 1 based on them. As described later, it is possible, for instance, to manufacture the GI-type photonic crystal slab 4 in which a siloxane structure is distributed correspondingly to the distribution function in a base material (slab 1604, refer to FIG. 16 (*d*)) of which main component is polysilane for instance.

In the case where, inversely to the above example, the refractive index distribution capable of manufacturing is predetermined and two of the three factors of the wavelength $\lambda$ of the light as a propagation subject, the beam spot radius $\omega_1$ and the film thickness W of the GI-type slab 1 are determined, it is possible to derive the remaining one factor adequately by using the formulas.

Next, a further detailed description will be given as to a light confinement mechanism in the film thickness direction of the GI-type photonic crystal slab 4.

As the light in the film of the GI-type photonic crystal slab 4 is controlled by a two-dimensional crystal lattice, discussions should be made as to the confinement of the light in the y direction on the cross-section 13 (refer to FIG. 2) which includes the y direction which corresponds to the film thickness direction and the z direction which corresponds to the light propagation direction. However, the larger the holes 2 are, the more significant light loss due to the diffraction becomes. Therefore, the z direction which corresponds to the light propagation direction is the direction indicated by one of basic lattice vectors 17 of a two-dimensional triangular lattice which configures the two-dimensional crystal lattice in which a share of the holes 2 is largest (that is, the cross-section of the hole 2 includes the diameter of the hole 2). The light confinement condition in the case of the large share of the holes 2 is applicable to all the cases where the share of the holes 2 is smaller.

Figure 3:
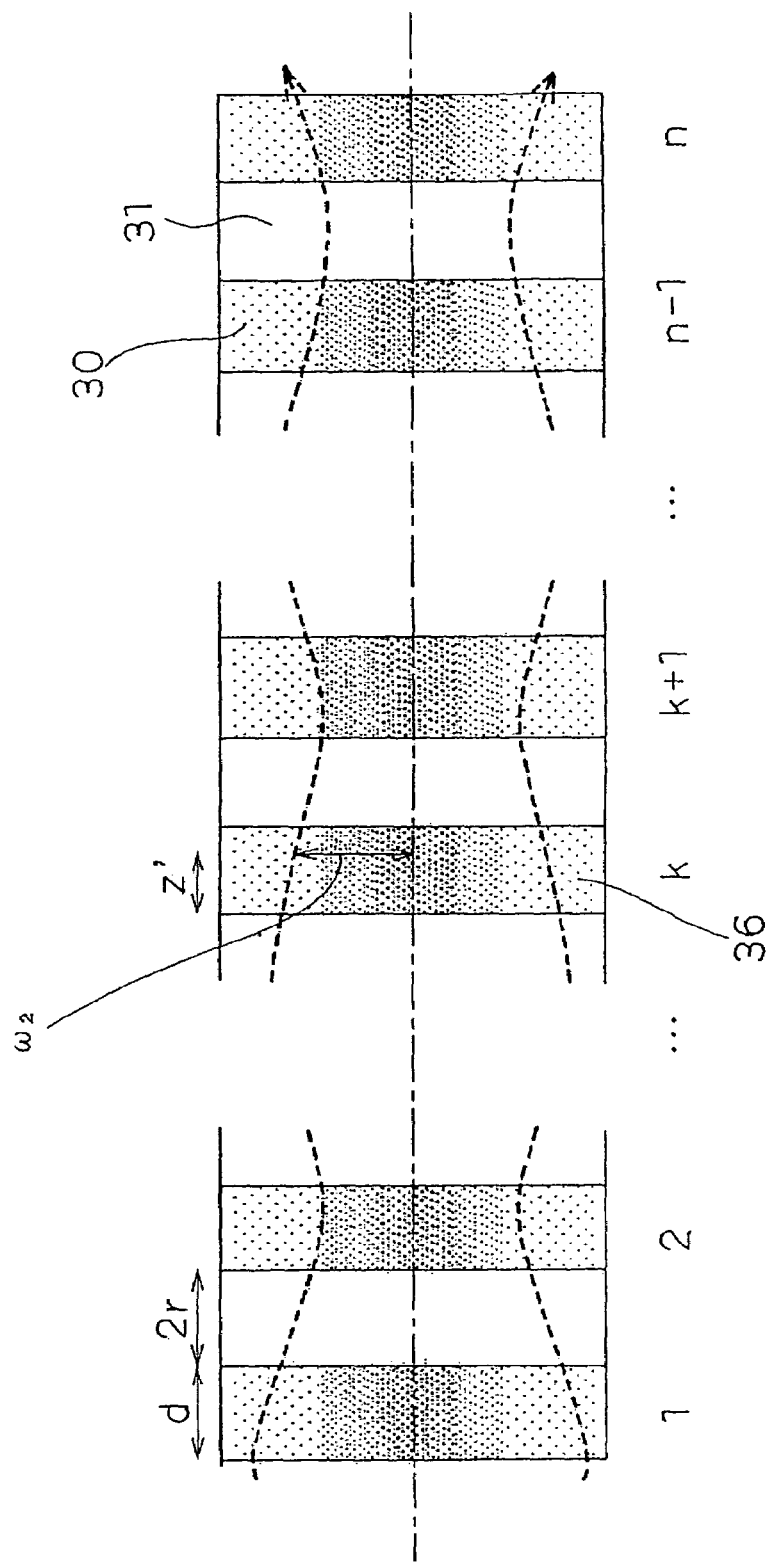
FIG. 3 is a schematic view of an analysis model of the GI-type photonic crystal slab according to the first embodiment of the present invention.

A beam analysis in the cross-section of FIG. 1 can be replaced by a one-dimensional lens waveguide model which has GRIN (Graded-Index) lenses 30 and layers of air 31 periodically cascaded as shown in FIG. 3.

Here, FIG. 3 is an analysis model of the GI-type photonic crystal slab which has the GRIN lenses cascaded.

Thus, an equation of Maxwell is scalar-analyzed by the beam analysis which uses a ray matrix.

The ray matrix per GRIN lens 30 which has a length d and the ray matrix per layer of air 31, which has a length $2r$ are represented by the following formulas 4 and 5 respectively. In these formulas, r denotes a hole radius and $n_0$ denotes the refractive index of the optical waveguide 5 which corresponds to the material before getting incident on the GI-type photonic crystal slab as previously described.

$$[\text{Lens}(d)] = \begin{bmatrix} \cos gd & \frac{1}{g}\sin gd \\ -g\sin gd & \cos gd \end{bmatrix} \quad \text{[Formula 4]}$$

$$[\text{Air}(r)] = \begin{bmatrix} 1 & 2r\frac{n_1}{n_0} \\ 0 & 1 \end{bmatrix} \quad \text{[Formula 5]}$$

Therefore, the ray matrix at the position of a distance z' (the distance from the GI-type photonic crystal incident end is $Z=(k-1) \times d+z'$) from the incident end of a k-th GRIN lens 36 (K=1, 2, ..., n) in the GI-type photonic crystal slab which has n pieces of GRIN lens 30 cascaded therein is represented by the following formula. In this formula, A, B, C and D denote matrix elements.

$$[GIPC(Z)] = [\text{Lens}(z')]([\text{Air}(r)][\text{Lens}(d)])^{k-1} = \begin{bmatrix} A & B \\ C & D \end{bmatrix} \quad [\text{Formula 6}]$$

The relation of the beam spot radius $\omega_2$ in the k-th GRIN lens 36 and the spot radius $\omega_1$ at the incident end 9 to such a ray matrix is represented by the following formula. In this formula, $R_1$ denotes the curvature radius of the wave front of the beam at the incident end.

$$\left(\frac{\omega_2}{\omega_1}\right)^2 = \left(A + \frac{B}{R_1}\right)^2 + \left(\frac{\lambda}{\pi\omega_1^2}\right)^2 B^2 \quad [\text{Formula 7}]$$

In this formula, A and B relate to a lens effect of the GRIN lens and constraint of the beam configured by space propagation of the holes while $\lambda/\omega_1$ relates to diffusion of the beam due to the diffraction effect. Therefore, the first term of the right-hand side of the formula 7 contributes to components of $\omega_1$ determined geometric-optically with no consideration of wave nature of the light and $\omega_2$ calculated from $R_1$. The second term thereof contributes to the component of $\omega_2$ resulting from the diffraction determined wave-optically with consideration of the wave nature of the light being suppressed by the lens effect represented by B.

Therefore, to make $\omega_2$ smaller, it is geometric-optically better to make $\omega_1$ smaller and make $R_1$ larger while it is wave-optically better to make $\omega_1$ larger and make $\lambda$ smaller. Under normal circumstances, however, the film thickness of the photonic crystal slab is generally smaller than about 9 μm of a mode field diameter (MFD) of a single-mode optical fiber (SMF). Therefore, $1/\omega_1$ influences the spot radius $\omega_2$ much more than $\omega_1$.

The beam spot radius $\omega_2$ is defined by a radius at which strength of a Gaussian beam is $1/e^2$ (e is a base of natural logarithm) of the maximum value at the center. Therefore, it does not mean that no beam exceeds the film thickness of the GI-type photonic crystal slab. However, the beam does not exceed the film thickness as long as the beam spot radius $\omega_2$ changes within the film thickness.

Next, it is desirable to represent the light confinement condition with the components of the GI-type photonic crystal slab, such as the refractive index distribution constant g, film thickness W and hole radius r.

However, it is very difficult to represent the light confinement condition with a relational expression of these components, and so it is practical to rely on a numerical analysis which uses a computing machine as to a concrete light confinement condition.

Hereunder, a necessary condition for light confinement in the GI-type photonic crystal slab is derived by using the relation between the hole radius r and the light confinement.

As is understandable from the ray matrix of the layer of air 31, the hole has no lens effect but has only the effect of promoting the diffraction. Therefore, the lens effect of the GI-type slab should be equal to or more than the diffraction effect in the case of no hole.

Therefore, the condition obtained by assigning r=0 is the necessary condition for light confinement.

The ray matrix from the incident end of the GI-type photonic crystal slab to a Z position when r=0 is represented by the following formula.

$$[GIPC(Z)] = \begin{bmatrix} \cos gZ & \frac{1}{g}\sin gZ \\ -g\sin gZ & \cos gZ \end{bmatrix} \quad [\text{Formula 8}]$$

And the formula 7 becomes as follows.

$$\left(\frac{\omega_2}{\omega_1}\right)^2 = \left(\cos gZ + \frac{1}{R_1}\frac{1}{g}\sin gZ\right)^2 + \left(\frac{\lambda}{\pi\omega_1^2}\right)^2\left(\frac{1}{g}\right)^2 \sin^2 gZ = \quad [\text{Formula 9}]$$

$$\frac{1}{R_1}\frac{1}{g}\sin 2gZ - \frac{1}{2}\left[\left\{\frac{1}{R_1^2} + \left(\frac{\lambda}{\pi\omega_1^2}\right)^2\right\}\left(\frac{1}{g}\right)^2 - 1\right]\cos 2gZ +$$

$$\frac{1}{2}\left[\left\{\frac{1}{R_1^2} + \left(\frac{\lambda}{\pi\omega_1^2}\right)^2\right\}\left(\frac{1}{g}\right)^2 + 1\right] =$$

$$\rho\sin\{2gZ - \theta\} + \frac{1}{2}\left[\left\{\frac{1}{R_1^2} + \left(\frac{\lambda}{\pi\omega_1^2}\right)^2\right\}\left(\frac{1}{g}\right)^2 + 1\right]$$

However, $\rho$ is taken to be as follows.

$$\rho = \sqrt{\left(\frac{1}{R_1}\frac{1}{g}\right)^2 + \frac{1}{4}\left[\left\{\frac{1}{R_1^2} + \left(\frac{\lambda}{\pi\omega_1^2}\right)^2\right\}\left(\frac{1}{g}\right)^2 - 1\right]^2} \quad [\text{Formula 10}]$$

And $\theta$ is taken to be as follows.

$$\cos\theta = \frac{1}{R_1}\frac{1}{g} \quad [\text{Formula 11}]$$

$$\sin\theta = \frac{1}{2}\left[\left\{\frac{1}{R_1^2} + \left(\frac{\lambda}{\pi\omega_1^2}\right)^2\right\}\left(\frac{1}{g}\right)^2 - 1\right] \quad [\text{Formula 12}]$$

Therefore, the maximum value $\omega_{2max}$ of $\omega_2$ which relates to Z satisfies the following formula.

$$\left(\frac{\omega_{2max}}{\omega_1}\right)^2 = \rho + \frac{1}{2}\left[\left\{\frac{1}{R_1^2} + \left(\frac{\lambda}{\pi\omega_1^2}\right)^2\right\}\left(\frac{1}{g}\right)^2 + 1\right] = \quad [\text{Formula 13}]$$

$$\sqrt{\left(\frac{1}{R_1}\frac{1}{g}\right)^2 + \frac{1}{4}\left[\left\{\frac{1}{R_1^2} + \left(\frac{\lambda}{\pi\omega_1^2}\right)^2\right\}\left(\frac{1}{g}\right)^2 - 1\right]^2} +$$

$$\frac{1}{2}\left[\left\{\frac{1}{R_1^2} + \left(\frac{\lambda}{\pi\omega_1^2}\right)^2\right\}\left(\frac{1}{g}\right)^2 + 1\right]$$

It is thereby understandable that the larger $R_1$ is, the smaller $\omega_{2max}$ becomes, which is advantageous for the sake of confining the light. Therefore, the case of the formula 14, hence the formula 15 is considered hereunder.

$$R_1 = \infty \quad [\text{Formula 14}]$$

$$\left(\frac{\omega_{2max}}{\omega_1}\right)^2 = \frac{1}{2}\left|\left(\frac{\lambda}{\pi\omega_1^2}\right)^2\left(\frac{1}{g}\right)^2 - 1\right| + \frac{1}{2}\left\{\left(\frac{\lambda}{\pi\omega_1^2}\right)^2\left(\frac{1}{g}\right)^2 + 1\right\} \quad [\text{Formula 15}]$$

It is understandable from the formula 15 that the following formula 17 applies in the case of the following formula 16.

$$g < \frac{\lambda}{\pi \omega_1^2} \quad \text{[Formula 16]}$$

$$\omega_{2max} = \frac{\lambda}{\pi \omega_1 g} \quad \text{[Formula 17]}$$

And the following formula 19 applies in the case of the following formula 18.

$$g \geq \frac{\lambda}{\pi \omega_1^2} \quad \text{[Formula 18]}$$

$$\omega_{2max} = \omega_1 \quad \text{[Formula 19]}$$

As a necessary and sufficient condition which confines the light is the following formula 20, the following formula 3 is acquired as the necessary condition which confines the light.

$$\omega_{2max} \leq W/2 \quad \text{[Formula 20]}$$

$$g \geq \frac{2\lambda}{\pi \omega_1 W} \quad \text{[Formula 3]}$$

The following formula 21 is used when deriving the formula 3. However, the formula 3 in the case where equality holds in the formula 21 becomes the following formula 22.

$$\omega_1 \leq W/2 \quad \text{[Formula 21]}$$

$$g \geq \frac{\lambda}{\pi}\left(\frac{2}{W}\right)^2 \quad \text{[Formula 22]}$$

It is thus understandable that advantageous conditions which confine the light are a high refractive index, a large incident spot radius, a large film thickness and a short wavelength.

Figure 4:
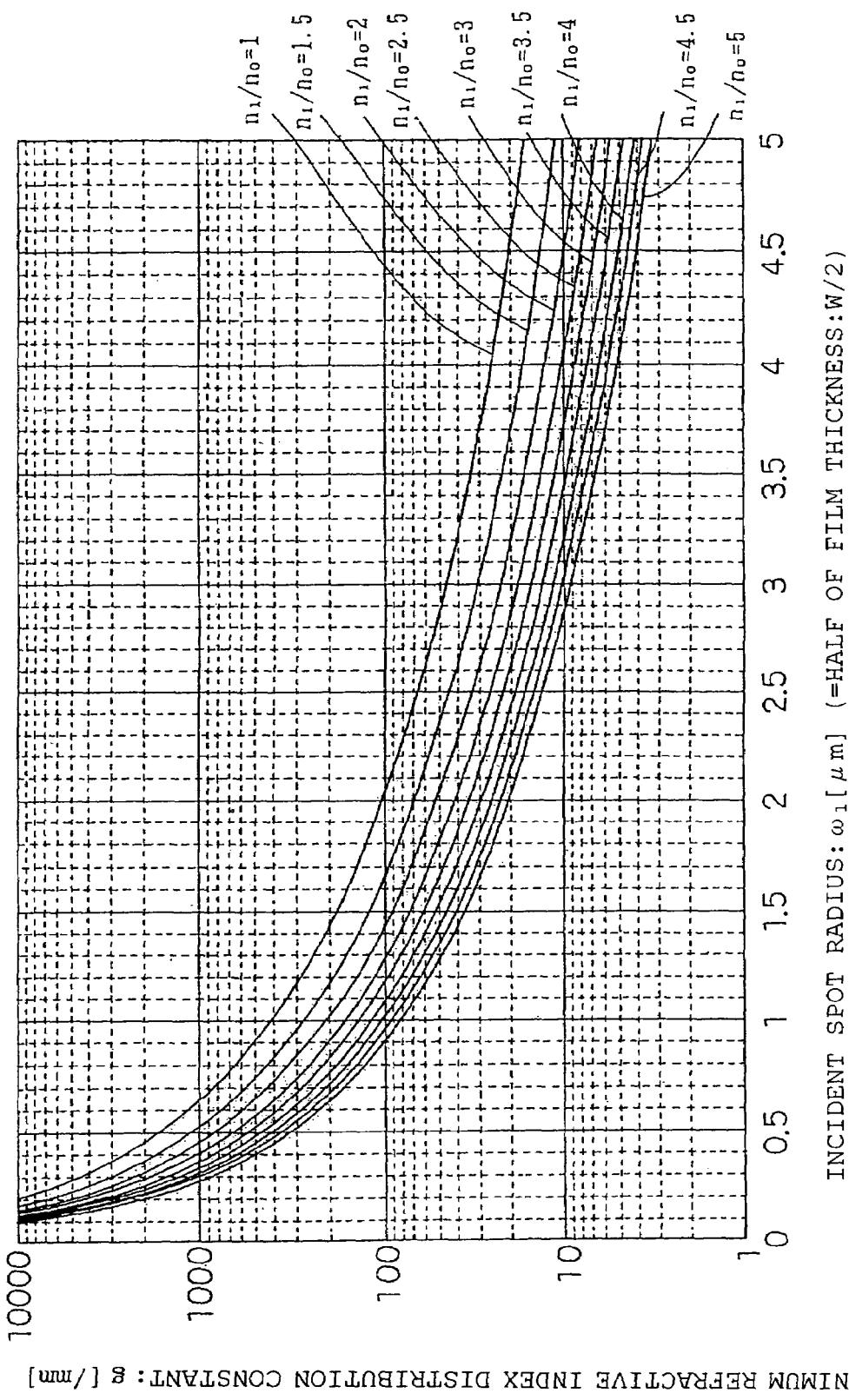
FIG. 4 is an explanatory diagram of a light confinement condition of the GI-type photonic crystal slab in the case where there is no hole according to the first embodiment of the present invention.

FIG. 4 shows a relation between the minimum refractive index distribution constant and the film thickness W of the GI-type photonic crystal slab obtained by taking equality in the formula 22 based on λ=1.3 μm.

Here, FIG. 4 shows the light confinement condition (relation between the film thickness W and the refractive index distribution constant g) in the case of the GI-type slab which has no hole. The vertical axis indicates a logarithmic scale.

FIG. 4 shows the relation in each of the cases where $n_1/n_0$ equal to (the beam spot radius $\omega_1$ inside the incident end 9)/(the beam spot radius outside the incident end 9) is changed, such as 1, 1.5, ..., 5.

Thus, FIG. 4 shows the beam spot radius outside the incident end 9. To be exact, it must be considered by replacing W of the formula 22 with $(n_1/n_0)$ W.

It is thereby understandable that the refractive index distribution constant g of at least 400/mm or more is required in the case where the film thickness is 2 μm and the refractive index of the waveguide on the incident end side is equal to the maximum refractive index of the GI-type photonic crystal slab (that is, in the case of $n_1/n_0$=1). It is also understandable that a smaller refractive index distribution constant g suffices when $n_1$ which corresponds to the maximum refractive index of the GI-type photonic crystal slab is set larger or $n_0$ which corresponds to the refractive index of the waveguide of the incident end is set smaller.

Figure 5:
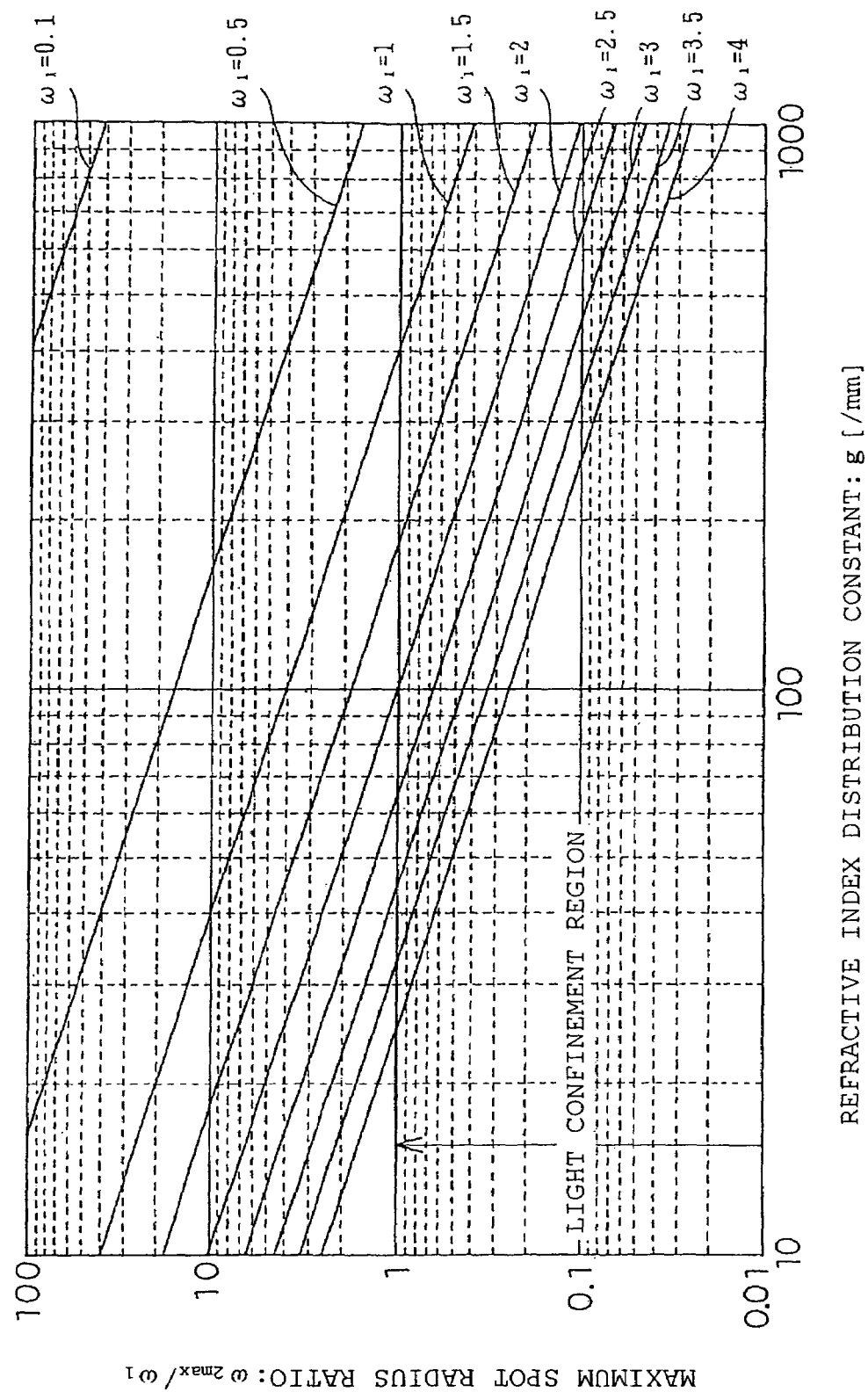
FIG. 5 is an explanatory diagram of a relation between a largest spot diameter $\omega_2$ and a refractive index distribution constant g in the GI-type photonic crystal slab in the case where there is no hole according to the first embodiment of the present invention.
Figure 6:
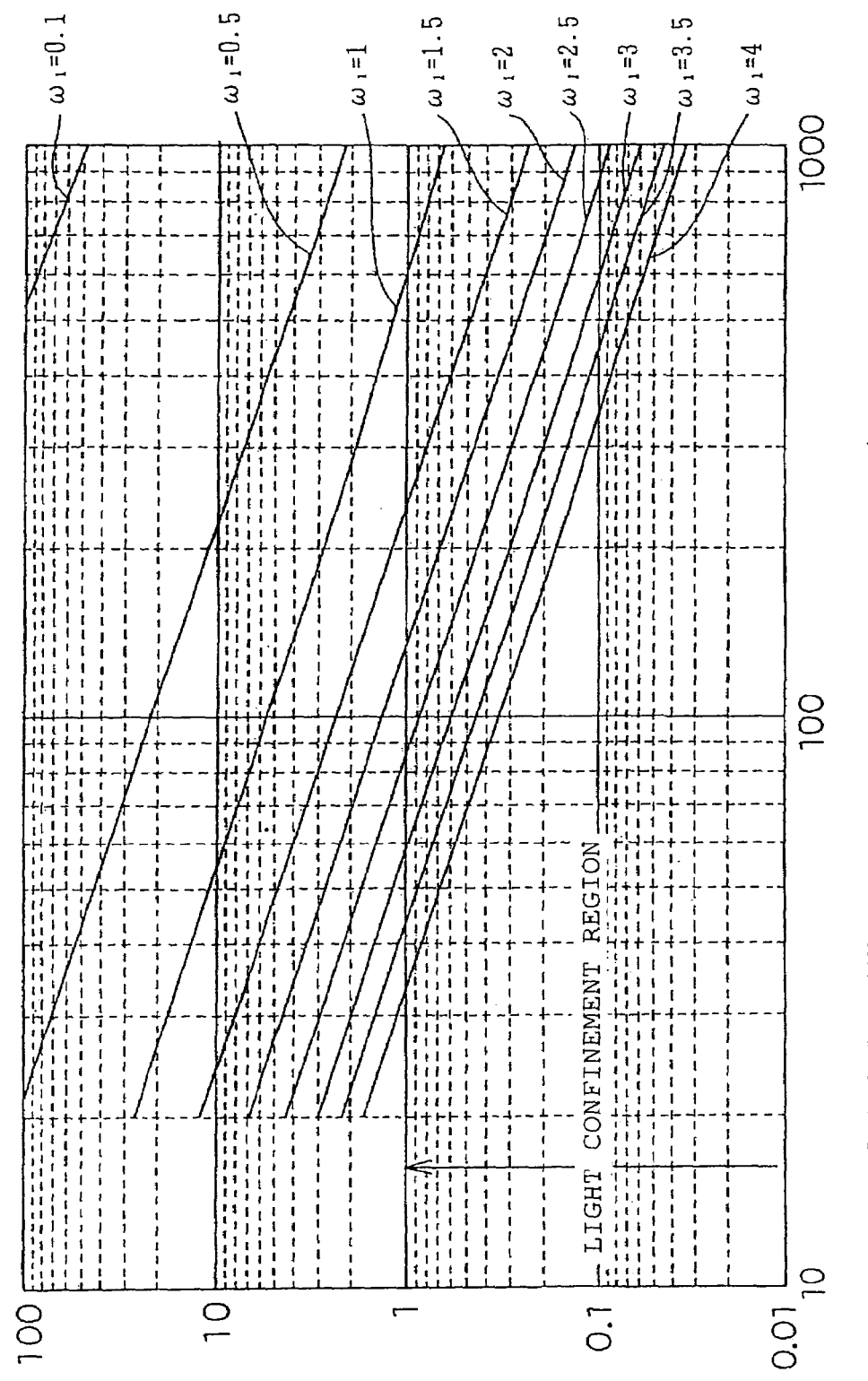
FIG. 6 is an explanatory diagram of the relation between the largest spot diameter $\omega_2$ and the refractive index distribution constant g in the GI-type photonic crystal slab in the case where the relation between a hole radius r and a period $\delta$ is approximately r=0.2×$\delta$ according to the first embodiment of the present invention.

Next, FIGS. 5 and 6 show the relations among the maximum spot radius $\omega_{2max}$ in the GI-type photonic crystal slab, the refractive index distribution constant g and the incident end spot radius $\omega_1$ in the case of $\omega_1$=W/2 when r=0 μm (there is no hole) and when approximately r=0.19 μm, d=0.74 μm if $n_0$ which corresponds to the refractive index of the waveguide of the incident end is equal to $n_1$ which corresponds to the maximum refractive index of the GI-type photonic crystal slab.

Here, FIG. 5 shows the relation between the maximum spot radius $\omega_{2max}$ and the refractive index distribution constant g per spot radius $\omega_1$ at the incident end in the case of the GI-type slab which has no hole. FIG. 6 shows the relation between the maximum spot radius $\omega_{2max}$ and the refractive index distribution constant g per spot radius $\omega_1$ at the incident end in the case of the GI-type slab when the relation between the hole radius r and a period δ(=d+2r) is approximately r=0.2×δ. The vertical axis and horizontal axis indicate the logarithmic scale.

FIGS. 5 and 6 show the relations in each of the cases of changing $\omega_1$ to 0.1, 0.5, ..., 4.

The following formula 23 obtained from the formula 15 in the case where the formula 16 holds is equivalent to the relation of FIG. 5.

$$\frac{\omega_{2max}}{\omega_1} = \frac{\lambda}{\pi \omega_1^2} \frac{1}{g} \quad \text{[Formula 23]}$$

As consideration is given to the case where the incident end spot radius $\omega_1$ is a half of the film thickness W of the GI-type photonic crystal slab, however, the maximum beam spot radius $\omega_{2max}$ in the GI-type photonic crystal slab must be smaller than the incident end spot radius $\omega_1$. Therefore, $\omega_{2max}/\omega_1$ should be 1 or less as the necessary and sufficient condition for the light confinement, and the relation between the refractive index distribution constant g and the incident end spot radius $\omega_1$ when $\omega_{2max}/\omega_1$=1 in FIG. 5 is equivalent to the relation of FIG. 4.

If FIG. 5 and FIG. 6 are compared, it is understandable that the relation between the refractive index distribution constant g and $\omega_{2max}$ is similar irrespective of whether or not there are the holes. As the diffraction becomes larger due to existence of the holes, however, the refractive index distribution constant g needs to be 1.5 times or so larger in the case where there are the holes compared to the case where there are none.

FIG. 7 show (a) a three-dimensional FDTD (Finite Difference Time Domain) simulation result 701a in the case of satisfying the light confinement condition of a conventional SI(Step-Index)-type photonic crystal slab 701 which changes the refractive index distribution stepwise as to the light propagation direction, (b) a three-dimensional FDTD simulation result 702a in the case of satisfying the light confinement condition of the SI-type photonic crystal slab 702 of a conventional air bridge structure, and (c) a three-dimensional FDTD simulation result 703a in the case of satisfying the light confinement condition of a GI-type photonic crystal slab 703 of approximately r=0.19 μm, d=0.74 μm according to this embodiment. However, they only show the cross-sections which include the propagation direction and film thickness direction.

It is understandable that, as to the light leakage of the SI-type photonic crystal slab (refer to FIG. 7 (a)), the light is completely confined if the air bridge structure (refer to FIG. 7 (b)) is implemented.

It is understandable that, in the case of the GI-type photonic crystal slab (refer to FIG. 7 (c)), the light is confined even if it has a substrate, and the light draws a meandering trajectory due to the lens effect (only a light collecting portion is shown).

Thus, it is possible to set the refractive index distribution constant g of the GI-type photonic crystal slab which has its maximum value around the center in the film thickness direction and lowers the refractive index almost like a parabola as it becomes distant from the maximum portion equal to or larger than a specific value determined by the film thickness and the like so as to confine the light irrespective of the refractive index of the substrate in the film thickness direction in which the light leaks due to the diffraction effect.

It is also possible to change the film thickness of the photonic crystal slab freely by manipulating the refractive index distribution constant g.

This embodiment describes the GI-type photonic crystal slab which has its maximum point around the center in the film thickness direction.

Figure 8:
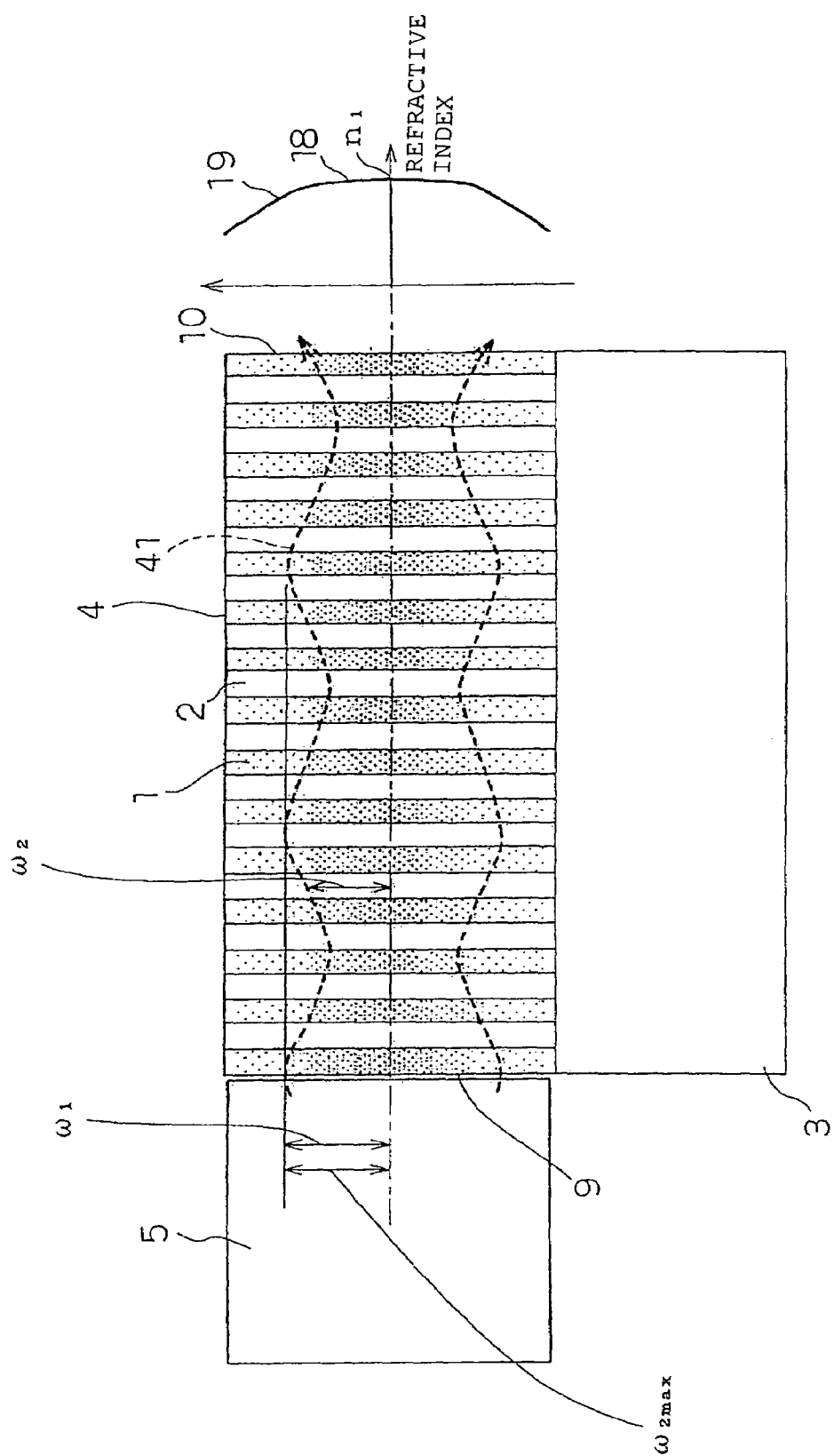
FIG. 8 is a schematic view of the GI-type photonic crystal slab (deformed example) according to the first embodiment of the present invention.

However, it is not limited thereto. As shown in FIG. 8, it is also possible to use a fixed portion 18 of which distance from the center which corresponds to y=0 is within a flat portion constant a and a refractive index distribution portion 19 other than the fixed portion 18 so as to lower the refractive index along the following formula 2.

$$n'(y) = \begin{cases} n_1\left\{1 - \frac{g^2(y+a)^2}{2}\right\} & (y \leq -a) \\ n_1 & (-a \leq y \leq a) \\ n_1\left\{1 - \frac{g^2(y-a)^2}{2}\right\} & (a \leq y) \end{cases}$$ [Formula 2]

Here, FIG. 8 is a schematic sectional view which includes the film thickness direction and propagation direction of the GI-type photonic crystal slab which has the refractive index distribution which forms a maximum region of an almost fixed value around the center in the film thickness direction and otherwise lowers the refractive index almost like a parabola according to the distance from the maximum region.

Even in this case, the lens effect occurs except the refractive index fixed portion, and so the light can be confined likewise.

As a matter of course, the diffraction effect is stronger in the fixed portion 18 because the refractive index in a film thickness direction 15 is fixed. However, there is no problem if the refractive index distribution constant g is rendered larger in the refractive index distribution portion 19.

An object of this configuration is to render the characteristic of the photonic crystal other than the film thickness direction of the fixed portion 18 easier to control by rendering the refractive index in the film thickness direction 15 fixed in the fixed portion 18.

To be more precise, it is easier to calculate the characteristic of the photonic crystal (photonic band) in the case where the refractive index of a periodically configured material is fixed. Therefore, it is easier to design by thus providing the fixed portion 18 at present.

Even in the case where the entire film thickness has the refractive index distribution, the characteristic of the photonic crystal is considered as a slight change from the characteristic of the case of a fixed refractive index when a difference between the maximum value and minimum value of the refractive index is as small as several percent or less so that there is often no problem in practice.

Second Embodiment

Next, an embodiment of a manufacturing method of the photonic crystal slab of the present invention will be described by referring to FIGS. 16 (a) to 18.

FIGS. 16 (a) to 16 (d) are diagrams describing the characterizing portions of the manufacturing method as to the GI-type photonic crystal slab described in the first embodiment. To be more specific, these diagrams show a mechanism (which corresponds to a second process of the present invention), which forms the refractive index distribution in the film thickness direction on a sheet-like polysilane 1601 (which corresponds to the base material of a first process of the present invention) applied on the substrate 3 (refer to FIGS. 1 and 16 (d)) by means of heating and ultraviolet irradiation in the vertical direction.

First, the principle of the method which forms the refractive index distribution of the present invention will be described by referring to FIGS. 16 (a) to 16 (d).

As shown in FIG. 16 (a), the sheet-like polysilane 1601 (refer to FIG. 16 (d)) changes from a polysilane structure 1602 of a high refractive index to a siloxane structure 1603 of a low refractive index due to an oxidation reaction on hardening caused by UV (ultraviolet) exposure and heat treatment.

Therefore, the oxidation reaction occurs on the UV-irradiated side (refer to FIG. 16 (d)) on the polysilane so as to generate the siloxane structure 1603. Consequently, oxygen concentration increases due to distribution of oxygen taken into the siloxane structure near the surface of the polysilane 1601 where a lot of the siloxane structures 1603 are distributed. FIG. 16 (b) is a schematic view showing variation in concentration distribution of the oxygen taken into the siloxane structure 1603 in the case where the UV-irradiation is implemented by using the sheet-like polysilane 1601 to which no diffusion of an oxide and the like is performed. The horizontal axis of FIG. 16 (b) represents the oxygen concentration while the vertical axis represents the distance from the center of the film thickness. FIG. 16 (c) is a schematic view showing variation in the refractive index distribution in the case of UV-irradiating the same sheet-like polysilane 1601 as above correspondingly to FIG. 16 (b). The horizontal axis of FIG. 16 (c) represents the refractive index while the vertical axis represents the distance from the center of the film thickness.

As shown in FIG. 16 (b) to 16 (d), the oxygen concentration decreases as it becomes distant from a UV-irradiation light source. And the siloxane structures 1603 of a low refractive index are distributed to decrease as becoming distant from the UV-irradiation light source, in other words, as going toward the center from the surface side of the polysilane 1601 as if in proportion to the oxygen concentration. FIG. 16 (d) represents the refractive index distribution by shading of dots, which indicates that the darker the area is, the higher the refractive index becomes, and the lighter the area is, the lower the refractive index becomes.

Thus, the polysilane structure 1602 portions and the siloxane structure 1603 portions generated by the oxidation reaction are distributed correspondingly to the oxygen concentration distribution. Therefore, it is possible to form the refractive index distribution freely according to the method of UV-irradiation and other condition setting.

Factors of the condition setting include time of the UV-irradiation, amount of the UV-irradiation, ambient temperature, oxygen concentration and the like. It is possible, by setting or controlling all or a part of these factors appropriately, to realize the refractive index distribution which satisfies the conditions of the formulas 1 to 3.

An important point in forming the refractive index distribution is to form a symmetrical distribution in reference to the center position of thickness of the hardened polysilane 1601.

The method which forms the symmetrical distribution will be described in further detail below.

In the case where the film thickness of the sheet-like polysilane 1601 is small, it is possible to consume the oxygen in the ambience. In the case where the film thickness of the sheet-like polysilane 1601 is large or the sheet-like polysilane 1601 does not contact the air directly due to the substrate and the like, however, it is possible to form the refractive index distribution even in an interior of the sheet-like polysilane 1601 where the oxygen in the ambience does not reach by diffusing the oxygen or oxide other than the oxygen concentration in the ambience in the interior of the pre-hardening sheet-like polysilane 1601 in advance. Oxygen delivery (oxygen concentration) is different between the substrate 3 side and the air side of the sheet-like polysilane 1601. Therefore, in the case where an amount of the UV-irradiation to be irradiated is equal vertically, the refractive index lowers more significantly on the air side which has larger amounts of oxygen delivery so that the maximum refractive index position moves to the substrate 3 side. However, the amount of the UV-irradiation to be irradiated from the substrate 3 side is rendered higher than the air side so as to be asymmetrical. This suppresses the oxidation reaction on the air side so as to form the symmetrical refractive index distribution in reference to the center position of the film thickness.

For instance, in the case of forming the refractive index distribution (refer to FIG. 16 (*b*)) of which refractive index becomes maximum at a film thickness center in reference to the film thickness direction and lowers along an approximately parabolic shape of central symmetry according to its distance from the film thickness center as with the refractive index distribution formed slab 1604 shown in FIG. 16 (*d*), the UV-irradiation of the same strength should be performed from above and below the sheet-like polysilane 1601 before hardening.

When performing exposure from the substrate 3 side in the case of hardening it by UV exposure, a material transparent to ultraviolet light is used as the material of the substrate 3, such as quartz, glass such as borate silicate glass, a ultraviolet transmitting resin or a crystalline board of $LiNbO_3$ or $LiTaO_3$.

In the case of the distribution of central symmetry, it becomes the distribution approximately along a parabola.

In the case where the film thickness of the sheet-like polysilane 1601 is large or in the case where the oxygen delivery becomes vertically asymmetrical due to the substrate 3, it is possible to adjust the refractive index distribution in the film thickness direction by adding the oxygen or oxide to the sheet-like polysilane in advance or rendering the Amount of the UV-irradiation vertically asymmetrical as in the case of the slab 1604.

Next, a description will be given as to a third process which forms the holes 2 (refer to FIG. 1) to the slab 1604 (refer to FIG. 16 (*d*)) in which the refractive index distribution is formed by the above process.

Figure 17A:
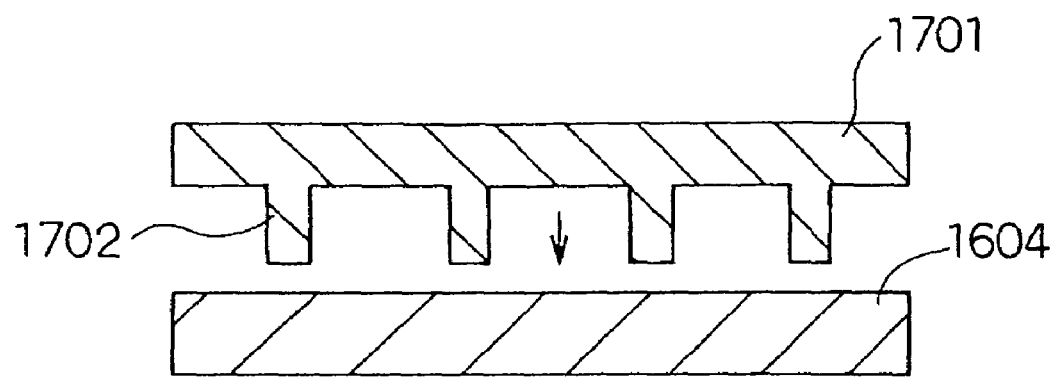
FIGS. 17 (a) to 17 (c) are explanatory diagrams of a hole forming method of the GI-type photonic crystal according to the second embodiment of the present invention.
Figure 17B:
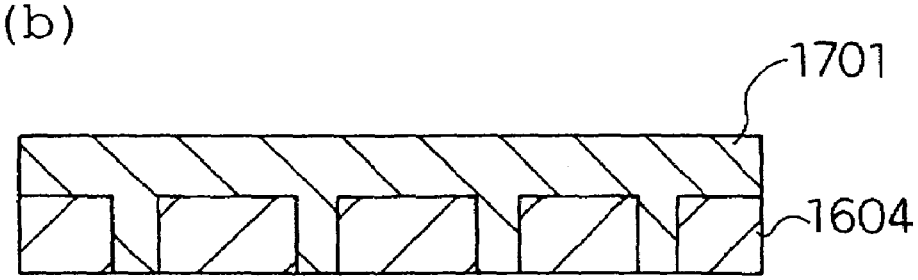
Figure 17C:
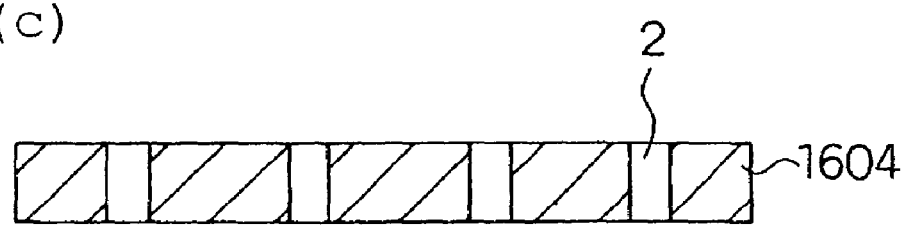
Figure 18A:
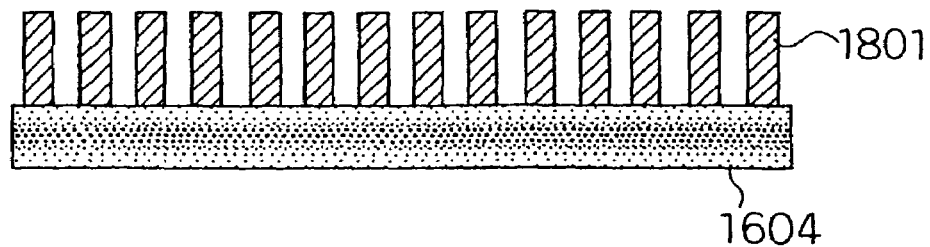
FIGS. 18 (a) to 18 (c) are explanatory diagrams of another hole forming method of the GI-type photonic crystal according to the second embodiment of the present invention.
Figure 18B:
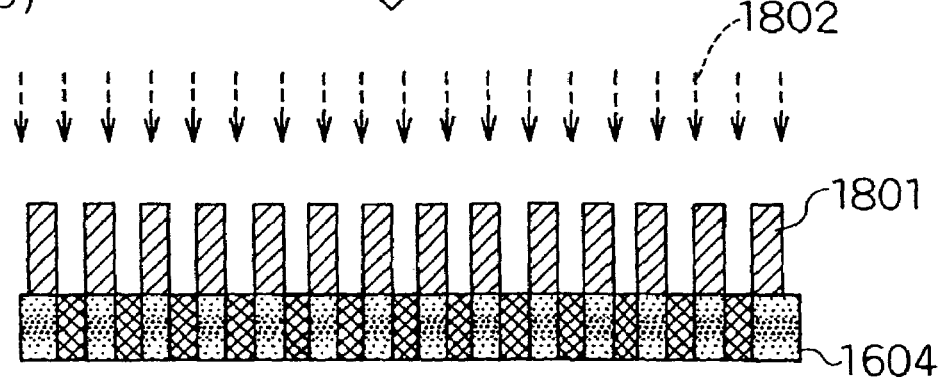
Figure 18C:
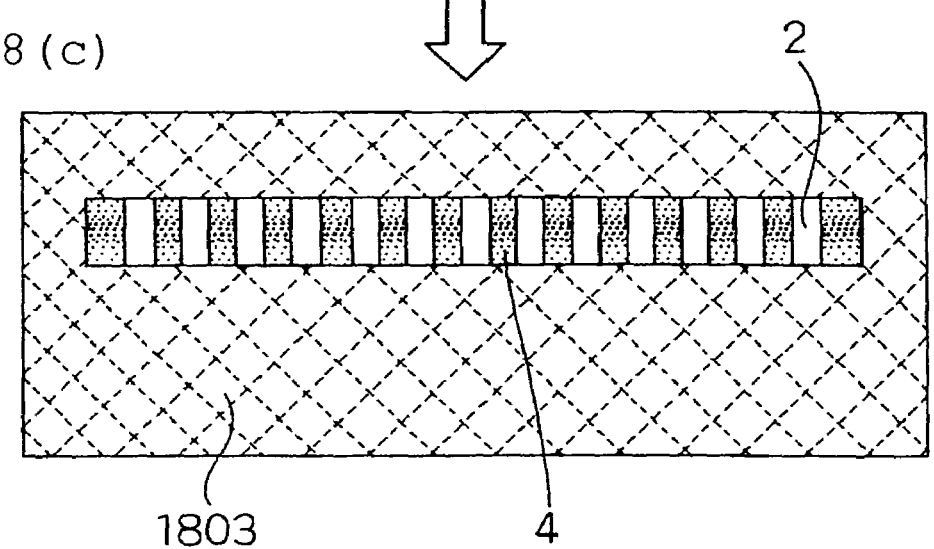

The holes 2 may be formed by any method, such as a method which uses a mold (refer to FIG. 17) or a method which performs an etching process after irradiating it with an ion beam (refer to FIG. 18).

FIGS. 17 (*a*) to 17 (*c*) are diagrams showing a process of pressing a mold 1701 against the slab 1604 (refer to FIGS. 17 (*a*) and 17 (*b*)) to form the holes 2 (refer to FIG. 17 (*c*)). Projections 1702 of the mold 1701 are placed correspondingly to a two-dimensional periodic structure of the holes 2 shown in FIG. 2.

FIGS. 18 (*a*) to 18 (*c*) are diagrams showing a process of placing masks 1801 on the slab 1604, irradiating it with an ion beam 1802 such as Ar, Xe or Kr and then forming the holes (erosion holes) 2 with strong alkali (NaOH) 1803.

It is possible, by the above process, to obtain the GI-type photonic crystal slab 4 which has the refractive index distribution in a symmetrical form against the center of the thickness direction.

In the case of this embodiment, the sheet-like polysilane 1601 is hardened in the second process, and so it is desirable to form the holes after the second process. However, it is not limited thereto.

Third Embodiment

Next, the configuration and operation of the optical device as an embodiment of the optical device of the present invention will be described by mainly referring to FIG. 9.

Figure 9:
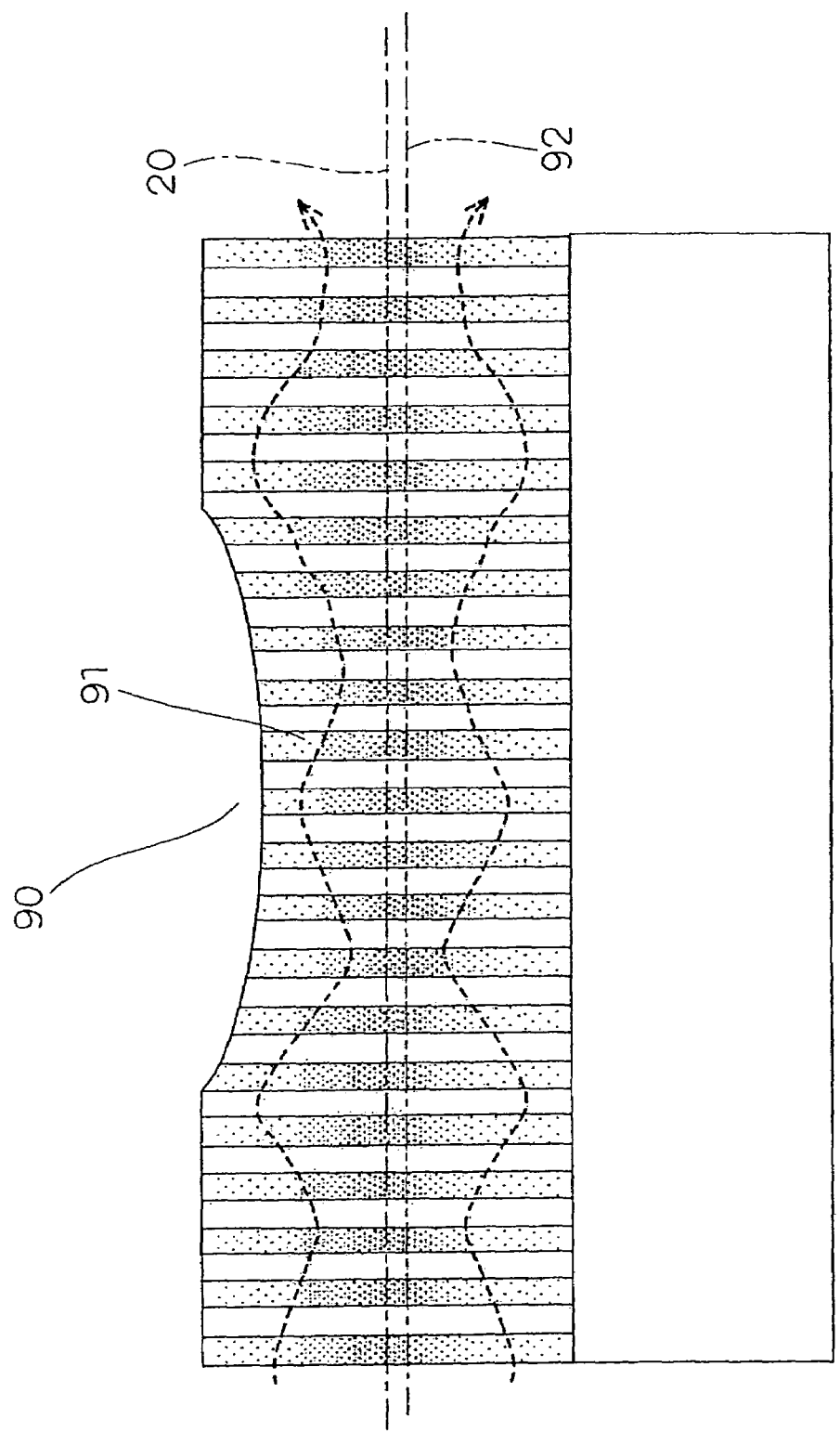
FIG. 9 is a schematic sectional view of the GI-type photonic crystal slab of which film thickness changes according to a third embodiment of the present invention.

Here, FIG. 9 is a schematic sectional view which includes the film thickness direction and propagation direction of the GI-type photonic crystal slab which changes the refractive index distribution form according to partial change in the film thickness in order to satisfy the light confinement condition.

As shown in FIG. 9, the GI-type photonic crystal slab includes a reduced film thickness portion 90 wherein the film thickness W changes in a certain part of the z direction which corresponds to the propagation direction. And the refractive index distribution constant g is changed to a larger value against the film thickness changed to confine the light in the reduced film thickness portion 90 so as to satisfy the aforementioned light confinement condition (refer to FIG. 3).

As the film thickness becomes smaller in the middle, a minimum refractive index distribution constant increased portion 91 is generated in order to suppress a larger diffraction of the reduced film thickness portion 90.

In the case where the film thickness change is not symmetrical in the film thickness direction, however, it is necessary to displace a reduced film thickness portion maximum refractive index position 92 from the surroundings in addition to the change in the refractive index distribution constant. In the case where the film thickness change is symmetrical, the maximum refractive index portion may be the same as the surroundings.

Inversely, in the case where the film thickness becomes large, the minimum refractive index distribution constant can be smaller than the surroundings so that the refractive index distribution constant does not necessarily have to be changed.

Even in the case where the film thickness becomes small, the refractive index distribution constant does not necessarily have to be changed if the refractive index distribution constant other than the reduced film thickness portion 90 is equal to or more than the minimum refractive index distribution constant of the reduced film thickness portion 90.

The above describes the cases of the film thickness change in the cross-section which includes the z direction which corresponds to the propagation direction and the y direction which corresponds to the film thickness direction. However, it is the same, as a matter of course, as to the film thickness change in the x direction which corresponds to the width direction.

A fixed refractive index distribution constant may be used in the entire GI-type photonic crystal slab in the case of using the refractive index distribution constant which is equal to or more than the minimum refractive index distribution constant which satisfies the light confinement condition for the film thickness of the least film thickness portion.

In the case where the film thickness becomes small at the portion where the beam spot radius becomes minimum in the GI-type photonic crystal slab, the minimum refractive index distribution constant which satisfies the light confinement condition can be small. It is because the minimum refractive index distribution constant which satisfies the light confinement condition is determined not to have the film thickness exceeded by the maximum value of the beam spot radius.

Fourth Embodiment

Next, the configuration and operation of the optical device of this embodiment will be described by mainly referring to FIG. 10.

Figure 10:
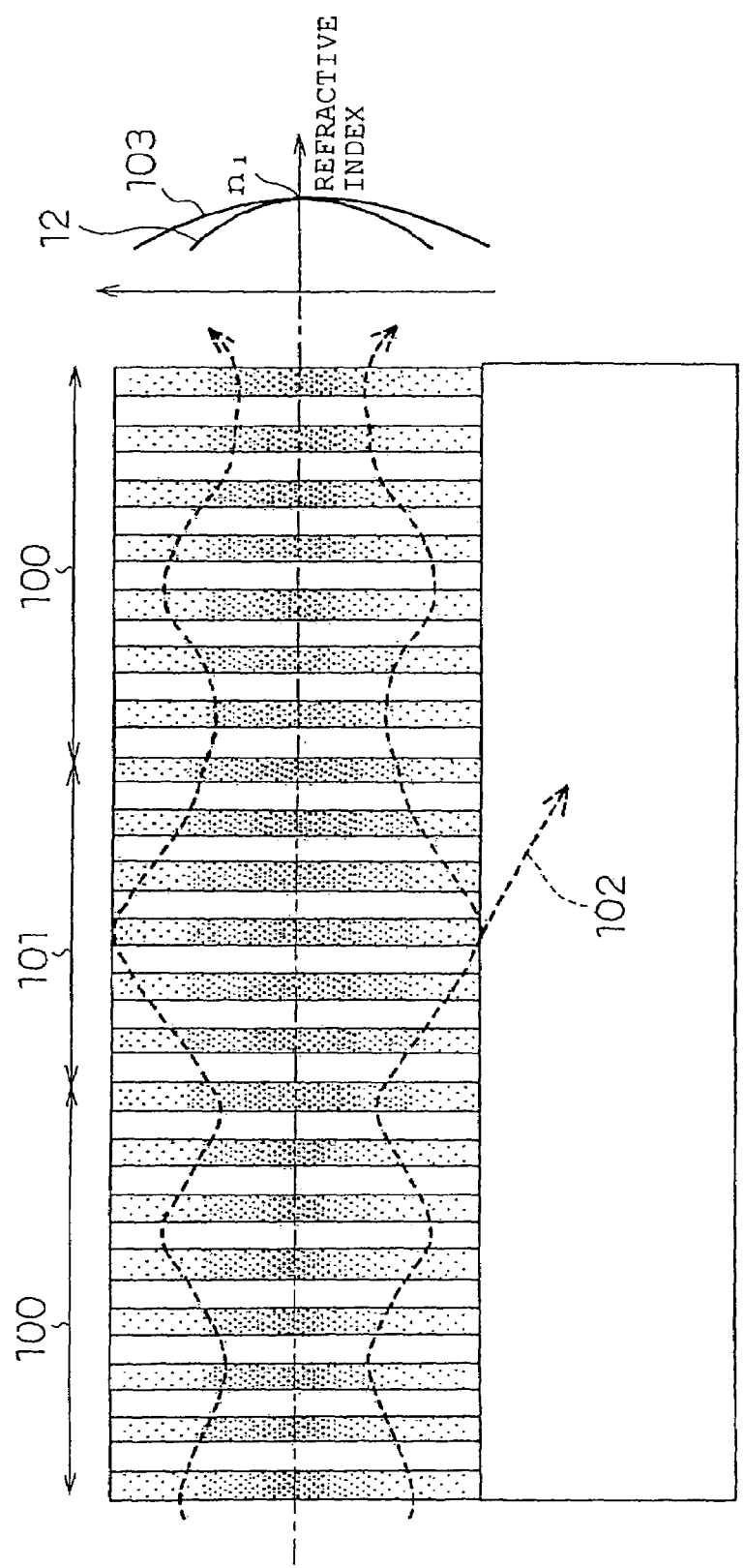
FIG. 10 is a schematic sectional view of the GI-type photonic crystal slab which intentionally controls propagation loss according to a fourth embodiment of the present invention.

Here, FIG. 10 is a schematic sectional view which includes the film thickness direction and propagation direction of the GI-type photonic crystal slab of a configuration which controls propagation loss in which a portion (light leakage portion 101) having the refractive index distribution 103 not satisfying the light confinement condition is intentionally formed in part.

The GI-type photonic crystal slab includes the light leakage portion 101 in which the refractive index distribution constant is lower than the minimum refractive index distribution constant required to confine the light in a certain portion in the z direction which corresponds to the propagation direction, where an attenuator function or a drop function which intentionally loses the light is attached.

According to this embodiment, an upper cladding of the GI-type photonic crystal slab is the air and a lower cladding is the substrate. Therefore, the light leakage of the light leakage portion 101 is only on the substrate side.

In the case of using the drop function, leaking light 102 is put in a cladding mode to propagate in the substrate, and is separated from a real signal propagating in the GI-type photonic crystal slab.

The above describes the method which directly renders the refractive index distribution constant lower than the minimum refractive index distribution constant required to confine the light and thereby causing the light leakage. However, it is also possible, as a matter of course, to render the film thickness thinner and render the minimum refractive index distribution constant required to confine the light larger so as to render the refractive index distribution constant relatively lower than the minimum refractive index distribution constant required to confine the light.

The above describes the change in the refractive index distribution constant in the cross-section which includes the z direction which corresponds to the propagation direction and the y direction which corresponds to the film thickness direction. However, it is the same as to the change in the refractive index distribution constant in the x direction which corresponds to the width direction.

It is also possible to cause the light leakage easily by not satisfying the light confinement condition in the portion where the beam spot radius becomes maximum in the GI-type photonic crystal slab.

Fifth Embodiment

Next, the configuration and operation of the optical device of this embodiment will be described by mainly referring to FIG. 11.

Figure 11:
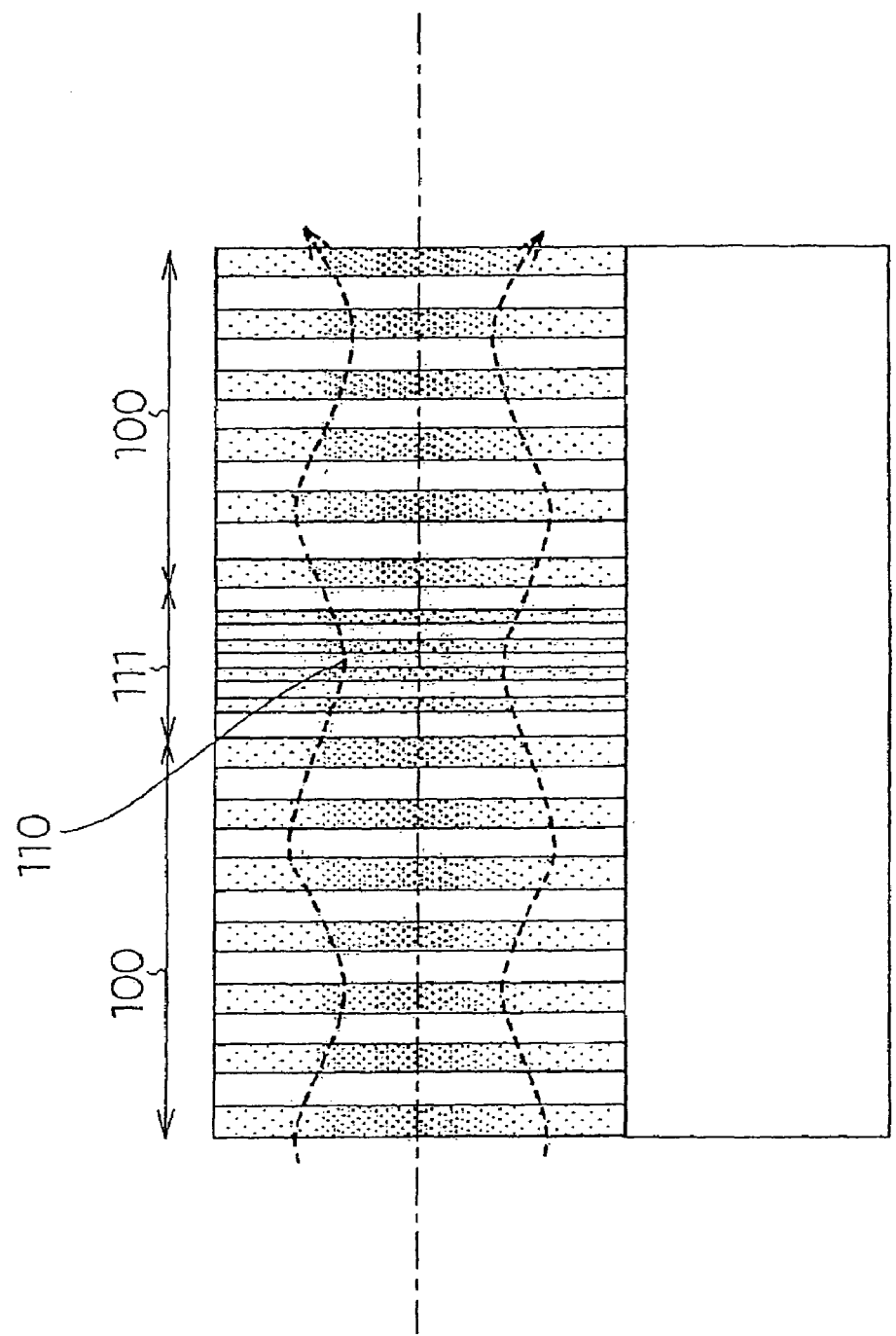
FIG. 11 is a schematic sectional view of the GI-type photonic crystal slab of which periodic structure is changed in proximity to a beam waist according to a fifth embodiment of the present invention.

Here, FIG. 11 is a schematic sectional view which includes the film thickness direction and propagation direction of the GI-type photonic crystal slab which forms a periodic structure which draws out a function of a specific photonic crystal in a beam waist region where the beam spot becomes small.

As shown in FIG. 11, a functional portion 111 which has a different period from the surroundings is formed for the sake of providing a specific function in a beam waist 110 where the beam spot radius in the GI-type photonic crystal slab becomes minimal.

If a functional photonic crystal portion which has a specific function is formed in the beam waist 110, the change in the refractive index in the portion which the beam passes through becomes minimal. Therefore, it becomes easier to design the device which uses the photonic band of the photonic crystal.

The above describes the case of changing the period. As a matter of course, the characteristics of the photonic crystal should be changed in short.

The first to fifth embodiments are described in detail above.

Figure 12:
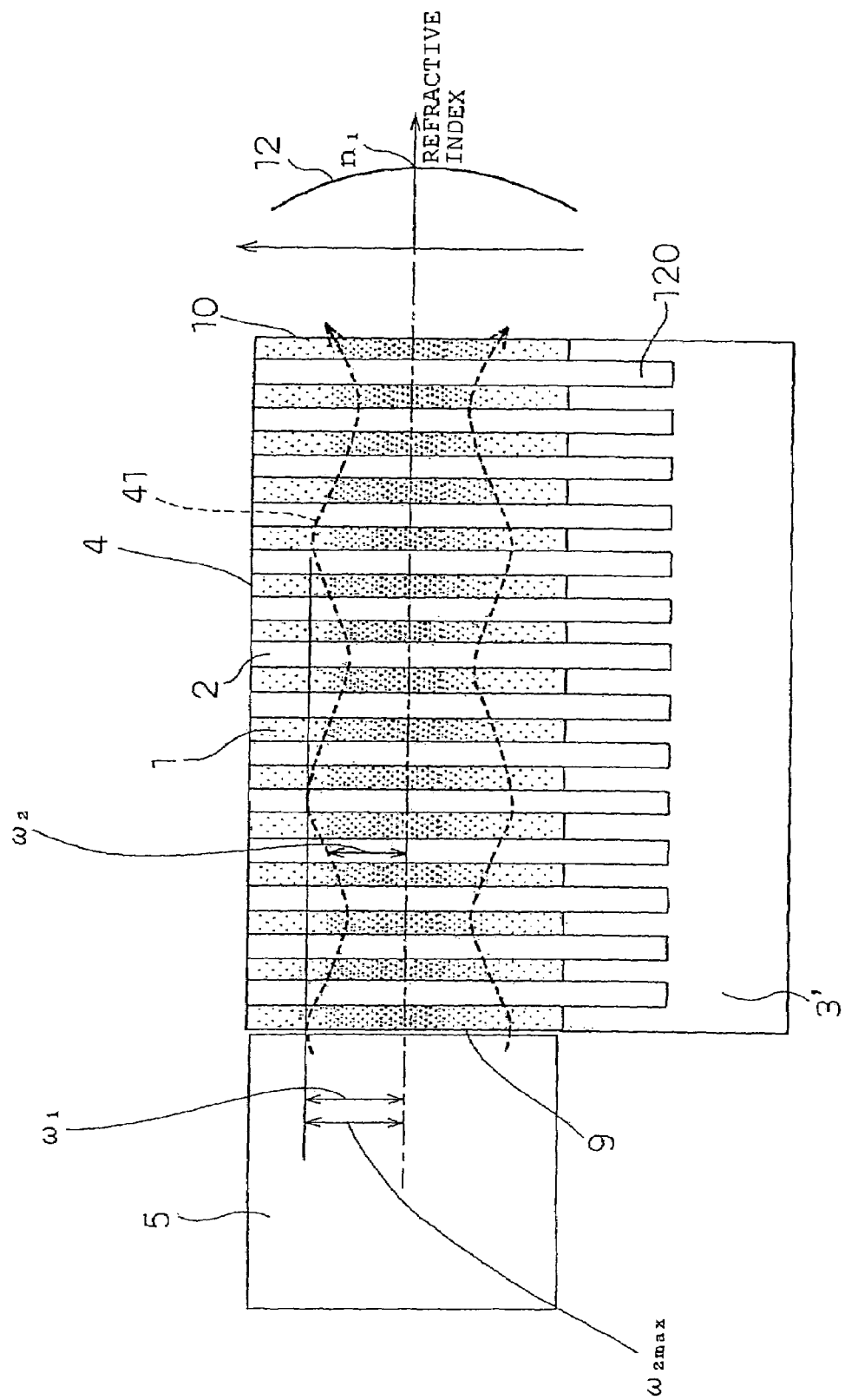
FIG. 12 is a schematic sectional view of the GI-type photonic crystal slab of which hole is extended to an interior of a substrate according to the embodiment of the present invention.

(A) The above describes the case where depth of the holes matches with height of the GI-type photonic crystal slab. As shown in FIG. 12, however, substrate interior holes 120 may be formed on a substrate 3' in order to confine the light more securely.

Here, FIG. 12 is a sectional view of the GI-type photonic crystal slab which has its holes extended to the substrate.

The substrate 3' corresponds to the substrate of the present invention.

Figure 13:
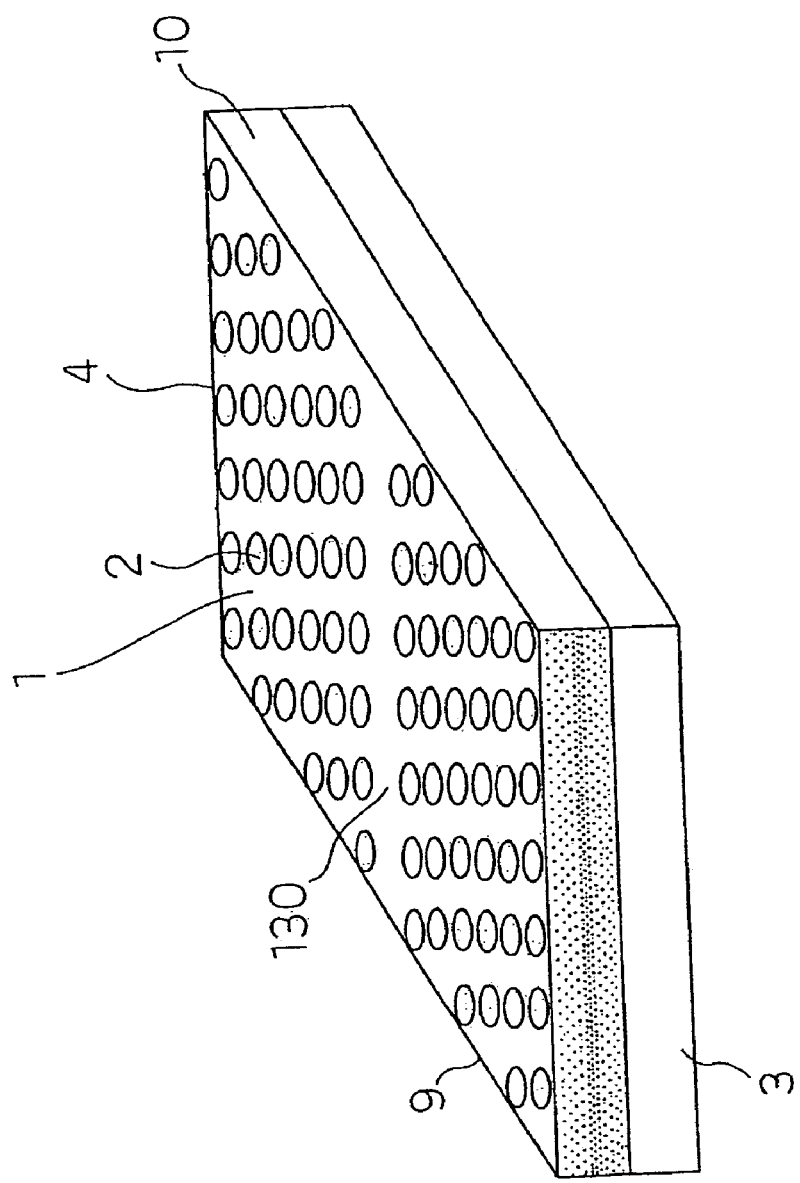
FIG. 13 is a schematic view of the GI-type photonic crystal slab which has a periodic defect sequence from an incident end to an outgoing end according to the embodiment of the present invention.

(B) The above describes the GI-type photonic crystal slab which has no defect. As shown in FIG. 13, however, the GI-type photonic crystal slab may include a periodic defect portion 130 which has no hole.

Here, FIG. 13 is a perspective view of the GI-type photonic crystal slab which has periodic defect sequences successively from the incident end to an outgoing end 10.

In the case where there is such a one-dimensional defect, the defect portion is equivalent to the above-mentioned model of the GI-type photonic crystal slab which has no hole. Therefore, the minimum refractive index distribution constant which satisfies the light confinement condition is smaller than a surrounding no-defect portion, and so the light can be confined either in the no-defect portion which has the holes or the defect portion.

In the case where there is a photonic bandgap in a periodic no-defect portion which has the holes periodically arranged, the light cannot go into the periodic no-defect portion. Therefore, the light propagates only in the periodic defect direction because the confinement in the film thickness direction is also effective.

To form a periodic defect, a change should be made to at least one of the refractive index, period and form of the periodically arranged material (member).

(C) It is also possible to use instrument which connects the GI-type photonic crystal slab which satisfies the light confinement condition to an external input portion.

As described above, the diffraction in the GI-type photonic crystal slab is significantly dependent on a beam state (curvature radius $R_1$, beam spot radius $\omega_1$) at the incident end of the GI-type photonic crystal slab.

For instance, in the case where the beam waist which has an infinite curvature radius and a minimum beam spot radius is ahead of the incident end, the beam enters the incident end rather expansively. In such a case, the maximum beam spot radius $\omega_{2max}$ in the GI-type photonic crystal slab becomes larger compared to the case where there is the beam waist at the incident end.

In the case where the beam waist is further inside than the incident end, the beam enters the incident end as if dwindling. In such a case, the beam waist radius in the GI-type photonic crystal slab becomes smaller than the case where there is the beam waist at the incident end. Therefore, the diffraction becomes larger, and the maximum beam spot radius $\omega_{2max}$ becomes larger than the case where there is the beam waist at the incident end.

Therefore, the maximum beam spot radius $\omega_{2max}$ in the GI-type photonic crystal slab is smallest in the case where there is the beam waist at the incident end.

However, such a beam waist is not made by the lens effect of the GI-type photonic crystal slab but is a portion where the beam spot radius dependent on an incident state which arises in the vicinity of the incident end becomes minimal.

Even in the case where the beam waist is made at the incident end, the larger the beam spot radius $\omega_1$ is, the smaller the diffraction becomes so that the minimum refractive index distribution constant for the light confinement can also be smaller. For this reason, the beam spot radius $\omega_1$ at the incident end should be as close to a half of the film thickness of the GI-type photonic crystal slab as possible.

However, such a beam spot radius $\omega_1$ at the incident end means the beam spot radius on an interior side of the GI-type photonic crystal, that is, based on the refractive index of the GI-type photonic crystal slab. In the case of discussing the beam spot radius immediately before the incidence, the beam spot radius should be converted because the phase velocity is different between the GI-type photonic crystal slab and the material on the incident side.

Figure 14:
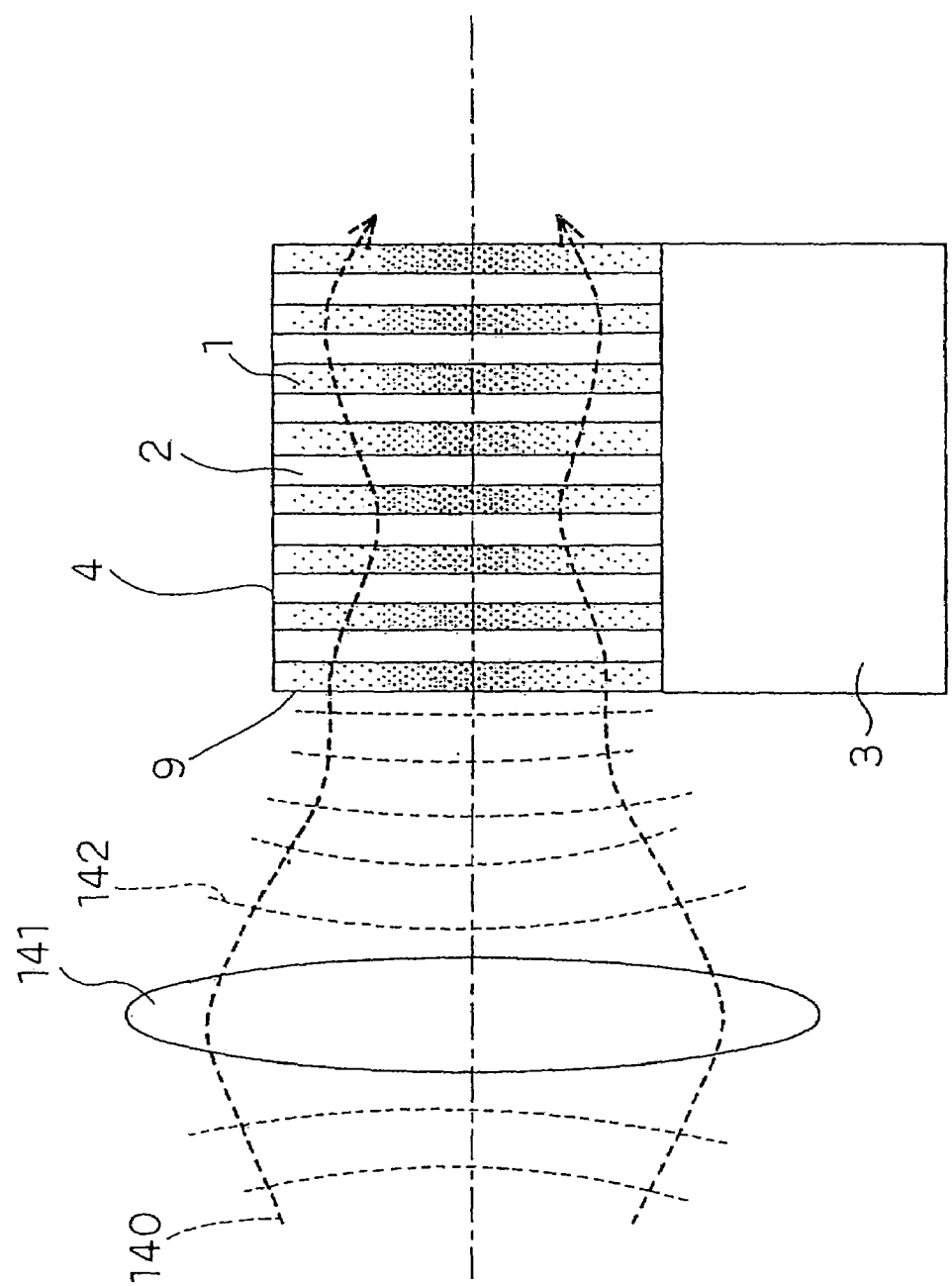
FIG. 14 is a schematic sectional view of the GI-type photonic crystal slab which has a lens which forms the beam waist at the incident end provided to an incident portion according to the embodiment of the present invention.

As for the method which creates the above-mentioned beam state at the incident end, there is a method which forms the beam waist of which beam spot radius is approximately equal to a half of the film thickness at the incident end by using a beam which converts portion such as a lens 141 as shown in FIG. 14.

Here, FIG. 14 is a schematic sectional view which includes the film thickness direction and propagation direction of the GI-type photonic crystal slab provided with a lens which forms the beam state in which the curvature radius becomes infinite at the incident end in its incident portion.

The lens 141 is corresponding to an inducing portion of the present invention.

In the case where the incident side is a space connection which uses a light source beam 140, a wave front 142 to be entered as the same phase plane is rather expansive. Therefore, it should be converted to be rather dwindling by using the lens 141 so as to form the beam waist at the incident end.

In the case where the incident side is the waveguide, a waveguide core diameter should approximately match with the film thickness when a mode field radius of the waveguide approximately matches with the mode field radius of the GI-type photonic crystal slab (that is, the refractive index of the waveguide is approximately equal to the refractive index of the GI-type photonic crystal slab)

Figure 15:
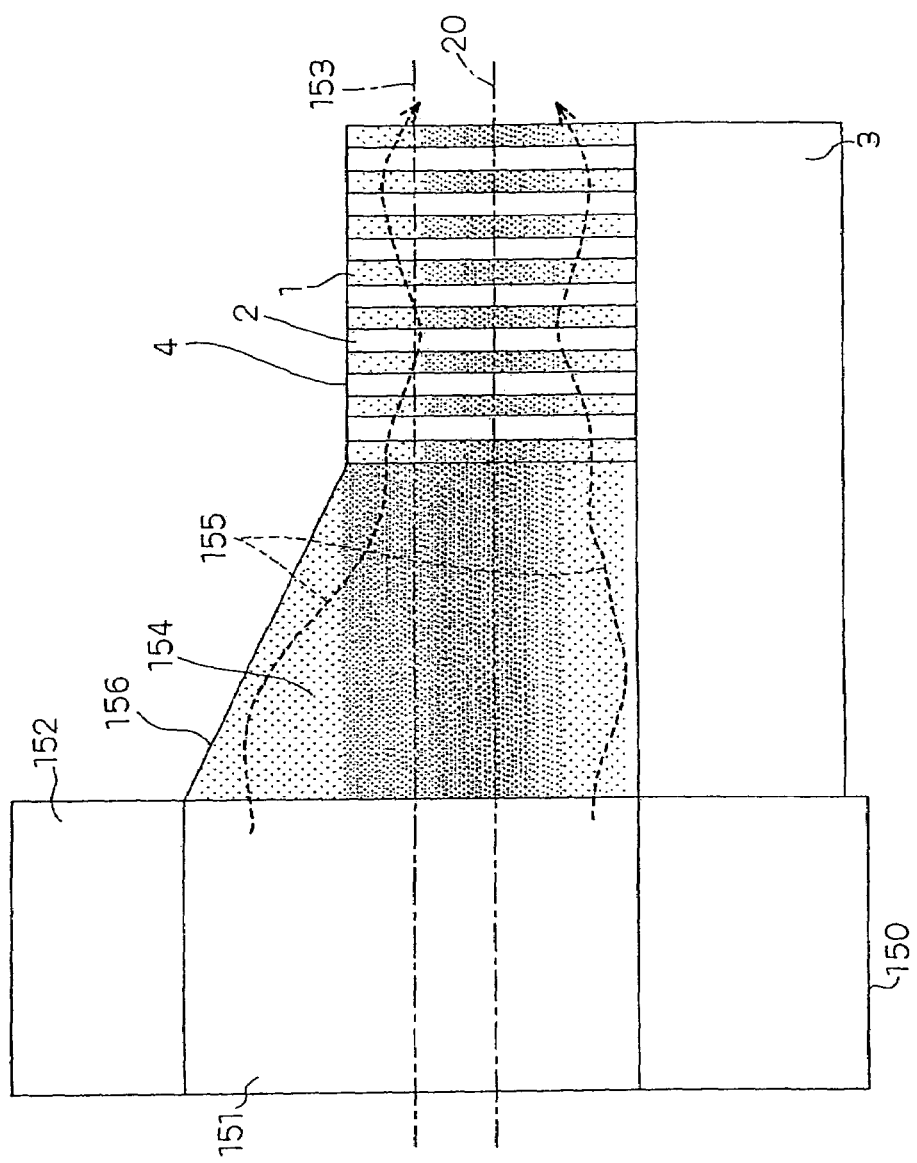
FIG. 15 is a schematic sectional view of the GI-type photonic crystal slab which has a beam inducing portion having a taper and refractive index distribution in a film thickness direction provided between itself and an optical fiber of a core diameter different from the film thickness according to the embodiment of the present invention.

In the case where not only the mode field radius but also an optical axis 153 of the optical fiber which corresponds to the waveguide is also displaced as in FIG. 15, however, it is also possible to use for a transition purpose a beam which induces portion 154 which includes a beam conversion function which uses a taper 156 and the refractive index distribution which relates to the film thickness direction and a function of inducing the light.

Here, FIG. 15 is a schematic sectional view including the film thickness direction and propagation direction of the GI-type photonic crystal slab provided with the beam inducing portion which includes the taper and the refractive index distribution in the film thickness direction at the incident end for the sake of connecting with the optical fiber which has a core diameter different from the film thickness in the film thickness direction.

The beam inducing portion 154 is corresponding to the inducing portion of the present invention.

FIG. 15 also shows a beam spot trajectory 155.

The above describes the input side. To propagate the light in both the directions, the output side of the GI-type photonic crystal slab should be provided with the same structure as the input side as a matter of course.

(D) According to the above-mentioned embodiment, the photonic crystal is in a film form, where a first direction is the direction of the film thickness of the film form and a second direction is the direction parallel to a film surface of the film form.

Figure 19:
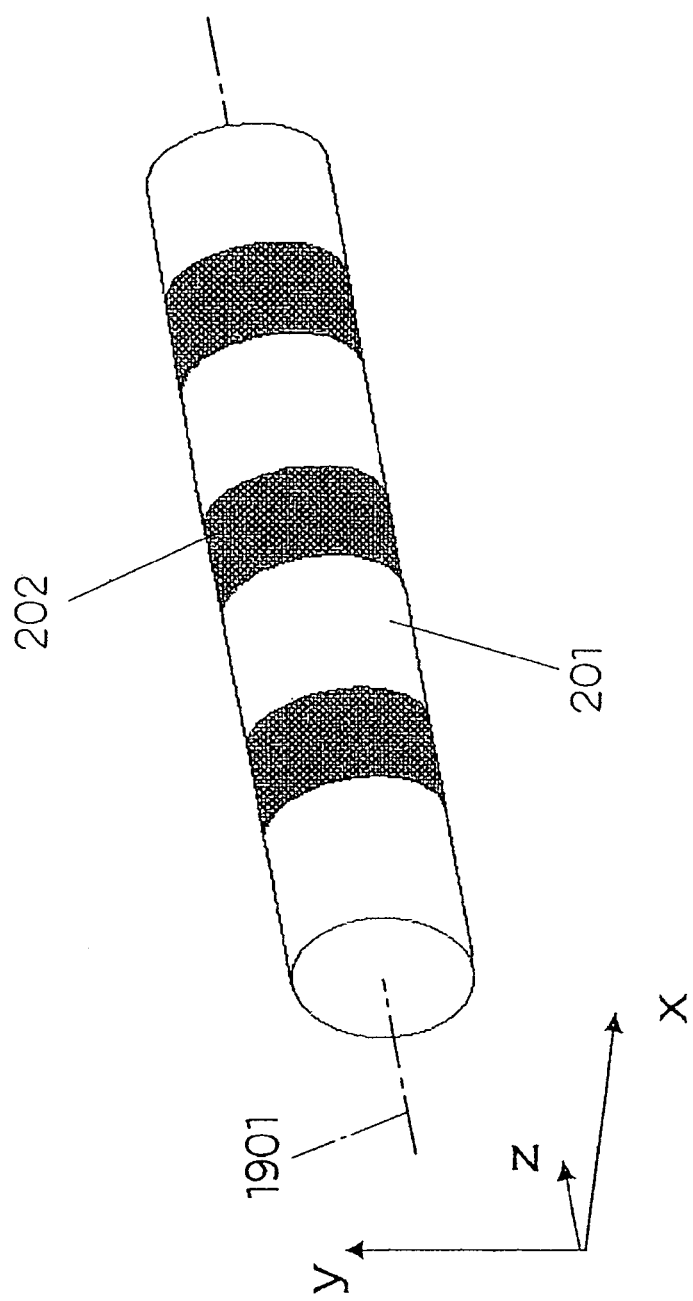
FIG. 19 is a schematic view of the GI-type photonic crystal in a columnar shape according to the embodiment of the present invention.

However, it is not limited thereto. As shown in FIG. 19 which is a schematic view of the GI-type photonic crystal in a columnar shape according to the embodiment of the present invention, the photonic crystal is in the columnar shape, where the first directions may be the x and y directions parallel to a bottom surface of the columnar shape and the second direction may be the z direction of the length of the columnar shape. In this case, the diameter of the column is corresponding to the film thickness W used in the formula 3.

In this case, the ultraviolet irradiation in a manufacturing process is performed by rotating the column while rotating its central axis 1901 as a rotation axis for instance. The method of irradiation is not limited thereto but may be any method which consequently performs the irradiation toward the central axis from the entire peripheral surface of the column.

Such a photonic crystal includes a second member 202 periodically placed in substance as to the z direction in a first member 201. The first member 201 has the refractive index distribution in which, for instance, the refractive index lowers almost like a parabola according to the distance from the center in the two directions of the x and y directions vertical to the z direction which corresponds to the optical axis direction. The embodiment mainly describes the case where the GI-type photonic crystal slab has the refractive index distribution in which the refractive index lowers like a parabola based on any one of the above-mentioned formulas 1 to 3 in the y direction (refer to FIG. 2). However, it is not limited thereto. In short, it should be the optical device which includes the photonic crystal provided with the first member which has the distribution of the refractive indexes reduced as getting farther from the optical axis of incident light as to the first direction vertical to the optical axis and the second member periodically placed in substance among the first members as to the second direction different from the first direction.

The manufacturing method of the optical device and photonic crystal slab of the present invention has the effect of being able to confine the light with a simpler optical system in a direction which has no period of the photonic crystal for instance, which is useful as a light confinement structure of the photonic crystal slab and the like.

The invention claimed is:

1. An optical device which includes a photonic crystal comprising:
    a first member having a refractive index distribution which decreases with distance from an optical axis extending through the photonic crystal, the refractive index distribution decreasing along a first direction perpendicular to the optical axis; and
    a plurality of second members substantially periodically placed within the first member along a second direction of the photonic crystal different from the first direction.

2. The optical device according to claim 1, wherein the photonic crystal includes a light incident end for receiving incident light and the photonic crystal is configured to substantially confine the incident light inside the photonic crystal along the first direction based on:
  (a) the refractive index distribution of the first member along the first direction;
  (b) a thickness of the photonic crystal along the first direction;
  (c) a wavelength of the incident light; and
  (d) a beam spot radius relative to the first direction inside the light incident end of the photonic crystal entered by the incident light.

3. The optical device according to claim 2, wherein:
  the photonic crystal is formed in a film form;
  the first direction is a direction of a film thickness of the film form; and
  the second direction is a direction parallel to a film surface of the film form.

4. The optical device according to claim 3, wherein the refractive index distribution of the first member which relates to the direction of the film thickness is more precipitous than a predetermined distribution function, the predetermined distribution function determined based on a thickness W which relates to the direction of the film thickness of the photonic crystal, the wavelength $\lambda$ of the incident light and a beam spot radius $\omega_1$ which relates to the direction of the film thickness inside the light incident end of the incident light.

5. The optical device according to claim 4, wherein a curvature radius of a wave front of the incident light at the light incident end is substantially infinite.

6. The optical device according to claim 5, wherein the beam spot radius $\omega_1$ is substantially a half of the thickness W.

7. The optical device according to claim 5, wherein the film thickness varies at a predetermined location.

8. The optical device according to claim 7, wherein at least a portion of the incident light is leaked outside the photonic crystal at the predetermined location along the film thickness direction based on:
  the refractive index distribution of the first member relative to the film thickness direction;
  the thickness W of the photonic crystal relative to the film thickness direction;
  the wavelength $\lambda$ of the incident light; and
  the beam spot radius $\omega_1$ inside the light incident end of the incident light as to the film thickness direction.

9. The optical device according to claim 5, wherein the substantially periodical placement of the plurality of the second members varies at a predetermined location.

10. The optical device according to claim 9, wherein the predetermined location is a location where the beam spot radius of the incident light inside the photonic crystal, which relates to the film thickness direction, takes a maximum value or a minimum value.

11. The optical device according to claim 5, wherein the photonic crystal includes a predetermined location extending from the light incident end to a light outgoing end of the photonic crystal which emits the light and has no second member substantially placed therein.

12. The optical device according to claim 5, wherein the plurality of second members includes air-filled holes which extend in the film thickness direction.

13. The optical device according to claim 12, further comprising a substrate which holds the photonic crystal, wherein the holes extend to a side of the substrate.

14. The optical device according to claim 4, wherein the predetermined distribution function is substantially given by the following quadric $$n(y) = n_1\left(1 - \frac{g^2 y^2}{2}\right)$$

which includes a refractive index distribution constant g and a maximum value $n_1$ of the refractive index distribution which relates to a y-coordinate about the direction of the film thickness in reference to the optical axis.

15. The optical device according to claim 14, wherein the refractive index distribution constant g substantially satisfies the following formula:

$$g \geq \frac{2\lambda}{\pi \omega_1 W}.$$

16. The optical device according to claim 4, wherein the predetermined distribution function is substantially given by the following function $$n'(y) = \begin{cases} n_1\left\{1 - \frac{g^2(y+a)^2}{2}\right\} & (y \leq -a) \\ n_1 & (-a \leq y \leq a) \\ n_1\left\{1 - \frac{g^2(y-a)^2}{2}\right\} & (a \leq y) \end{cases}$$

which includes a refractive index distribution constant g, a flat portion constant a and a maximum value $n_1$ of the refractive index distribution which relates to a y-coordinate about the direction of the film thickness in reference to the optical axis.

17. The optical device according to claim 16, wherein the refractive index distribution constant g substantially satisfies the following formula:

$$g \geq \frac{2\lambda}{\pi \omega_1 W}.$$

18. The optical device according to claim 2, further comprising an inducing portion which induces the incident light to the light incident end.

19. The optical device according to claim 18, wherein the inducing portion converts the incident light to render a curvature radius of the wave front at the light incident end substantially infinite.

20. The optical device according to claim 18, wherein the inducing portion converts the incident light to have a beam waist formed at the light incident end.

21. The optical device according to claim 18, wherein the inducing portion converts the incident light to render the beam spot radius which relates to the first direction inside the light incident end substantially a half of the thickness of the photonic crystal which relates to the first direction.

22. The optical device according to claim 2, wherein the first member includes a base material of which a main component is polysilane and the first member has a siloxane structure distributed correspondingly to the refractive index distribution in the base material.

* * * * *